United States Patent
Liu et al.

(10) Patent No.: US 12,218,765 B2
(45) Date of Patent: Feb. 4, 2025

(54) ELECTRONIC APPARATUS, WIRELESS COMMUNICATION METHOD, AND COMPUTER READABLE STORAGE MEDIUM

(71) Applicant: Sony Group Corporation, Tokyo (JP)

(72) Inventors: Min Liu, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 38 days.

(21) Appl. No.: 17/766,256

(22) PCT Filed: Nov. 9, 2020

(86) PCT No.: PCT/CN2020/127429
§ 371 (c)(1),
(2) Date: Apr. 4, 2022

(87) PCT Pub. No.: WO2021/093699
PCT Pub. Date: May 20, 2021

(65) Prior Publication Data
US 2024/0106577 A1    Mar. 28, 2024

(30) Foreign Application Priority Data
Nov. 15, 2019  (CN) .......................... 201911119683.1

(51) Int. Cl.
*H04L 1/1829* (2023.01)
*H04L 1/1822* (2023.01)
*H04W 72/11* (2023.01)

(52) U.S. Cl.
CPC .......... *H04L 1/1861* (2013.01); *H04L 1/1822* (2013.01); *H04W 72/11* (2023.01)

(58) Field of Classification Search
CPC ..... H04L 1/1861; H04L 1/1822; H04L 27/34; H04L 5/0055; H04L 1/1607;
(Continued)

(56) References Cited

U.S. PATENT DOCUMENTS

| 2020/0177323 A1* | 6/2020 | Fakoorian | H04W 72/21 |
| 2020/0413424 A1* | 12/2020 | Fakoorian | H04W 76/11 |
| 2022/0271868 A1* | 8/2022 | Cheng | H04W 72/23 |

FOREIGN PATENT DOCUMENTS

| CN | 109792326 A | 5/2019 |
| CN | 110300458 A | 10/2019 |

(Continued)

OTHER PUBLICATIONS

CATT: "Remaining issues on HARQ-ACK codebook", 3GPP Draft; RI-1806301-REMAINING Issues On HARQ-ACK Codebook, 3rd Generation Partnership Project (3GPP), Mobile Competence Centre ; 650, Route Des Lucioles ; F-06921 Sophia-Antipolis Cedex ; France vol. RAN WGI, No. Busan, Korea; May 21, 2018-May 25, 2018 May 20, 2018 (May 20, 2018), XP051441508.

(Continued)

*Primary Examiner* — Mang Hang Yeung
(74) *Attorney, Agent, or Firm* — XSENSUS LLP

(57) ABSTRACT

An electronic apparatus according to the present disclosure comprises a processing circuit configured to: if parts of HARQ processes between the electronic apparatus and a user equipment unit are configured to not send feedback information, configure a codebook type belonging to the user equipment unit and used to send feedback information to be a dynamic codebook or a semi-static codebook; and send to the user equipment unit information indicating the codebook type, wherein the electronic apparatus sets a default value of the codebook type to be a dynamic codebook, such that the user equipment unit determines the codebook type for sending feedback information to be the (Continued)

dynamic codebook if no information indicating the codebook type is received from the electronic apparatus.

16 Claims, 10 Drawing Sheets

(58) Field of Classification Search
CPC .... H04L 1/1812; H04L 5/0053; H04W 72/11; H04W 72/1273; H04W 72/23
USPC .......................................................... 370/329
See application file for complete search history.

(56) References Cited

FOREIGN PATENT DOCUMENTS

| | | |
|---|---|---|
| CN | 110351837 A | 10/2019 |
| WO | 2019/073358 A1 | 4/2019 |

OTHER PUBLICATIONS

International Search Report and Written Opinion mailed on Feb. 8, 2021, received for PCT Application PCT/CN2020/127429, Filed on Nov. 9, 2020, 9 pages including English Translation.

* cited by examiner

ELECTRONIC APPARATUS, WIRELESS COMMUNICATION METHOD, AND COMPUTER READABLE STORAGE MEDIUM

CROSS-REFERENCE TO RELATED APPLICATIONS

This application is based on PCT/CN2020/127429, filed on Nov. 9, 2020, which claims the priority to Chinese Patent Application No. 201911119683.1 titled "ELECTRONIC APPARATUS, WIRELESS COMMUNICATION METHOD, AND COMPUTER READABLE STORAGE MEDIUM", filed on Nov. 15, 2019 with the China National Intellectual Property Administration (CNIPA), the entire contents of each are incorporated herein by reference in its entirety.

FIELD

Embodiments of the present disclosure generally relate to the technical field of wireless communications, in particular to an electronic device, a wireless communication method and a computer readable storage medium. More particularly, the present disclosure relates to an electronic device as a network side device in a wireless communication system, an electronic device as a user equipment in a wireless communication system, a wireless communication method performed by a network side device in a wireless communication system, a wireless communication method performed by a user equipment in a wireless communication system and a computer readable storage medium.

BACKGROUND

Hybrid automatic repeat request (HARQ) technology is formed by combining a forward error correction (FEC) technology with an automatic repeat request technology. In a case of decoding failure, the receiver may save received data and request a sender to retransmit data, and merges the retransmitted data with the previously received data before decoding. In this way, a diversity gain may be formed, thereby reducing the number of times of repeated transmissions and reducing a delay. According to the conventional standards, the user equipment may transmit feedback information by using a dynamic code book or a semi-persistent code book. The feedback information may include ACK and NACK.

In recent research, the network side device may start or shut a HARQ process between the network side device and the user equipment, which can, for example, improve the system efficiency of non-terrestrial network (NTN). That is, when a HARQ process between the network side device and the user equipment is configured to be started, the user equipment is required to generate feedback information for downlink information carried by the HARQ process and transmit the feedback information to a network side. When a HARQ process between the network side device and the user equipment is configured to be shut, the user equipment is not required to generate the feedback information for the downlink information carried by the HARQ process.

Therefore, it is required to propose a technical solution to improve a HARQ feedback process in a case where a partial or all HARQ processes between the network side device and the user equipment are configured to not transmit feedback information.

SUMMARY

This section provides a general summary of the present disclosure, rather than a comprehensive disclosure of full scope or all features of the present disclosure.

An electronic device, a wireless communication method and a computer readable storage medium are provided according to the present disclosure, to improve a HARQ feedback process in a case where a partial or all HARQ processes between a network side device and a user equipment are configured to not transmit feedback information.

An electronic device is provided according to one aspect of the present disclosure. The electronic device includes processing circuitry. The processing circuitry is configured to: configure, in a case where a partial HARQ processes between the electronic device and a user equipment are configured to not transmit feedback information, a type of a code book of the user equipment which is used for transmitting feedback information as a dynamic code book or a semi-persistent code book; and transmit information representing the type of the code book to the user equipment, where the electronic device configures a default value of the type of the code book as the dynamic code book, such that in a case where the user equipment receives no information representing the type of the code book from the electronic device, the type of the code book which is used for transmitting feedback information is determined as the dynamic code book.

An electronic device is provided according to another aspect of the present disclosure. The electronic device includes processing circuitry. The processing circuitry is configured to: receive, in a case where a partial HARQ processes between a network side device and the electronic device are configured to not transmit feedback information, information representing a type of a code book for transmitting feedback information from the network side device; and determine the type of the code book as a dynamic code book or a semi-persistent code book according to the information, where in a case where the electronic device receives no information from the network side device, the type of the code book for transmitting feedback information is determined as the dynamic code book.

A wireless communication method performed by an electronic device is provided according to another aspect of the present disclosure. The wireless communication method includes configuring, in a case where a partial HARQ processes between the electronic device and a user equipment are configured to not transmit feedback information, a type of a code book of the user equipment which is used for transmitting feedback information as a dynamic code book or a semi-persistent code book; and transmitting information representing the type of the code book to the user equipment, where the electronic device configures a default value of the type of the code book as the dynamic code book, such that in a case where the user equipment receives no information representing the type of the code book from the electronic device, the type of the code book which is used for transmitting feedback information is determined as the dynamic code book.

A wireless communication method performed by an electronic device is provided according to another aspect of the present disclosure. The wireless communication method includes receiving, in a case where a partial HARQ processes between a network side device and the electronic device are configured to not transmit feedback information, information representing a type of a code book for transmitting feedback information from the network side device;

and determining the type of the code book as a dynamic code book or a semi-persistent code book according to the information, where in a case where the electronic device receives no information from the network side device, the type of the code book for transmitting feedback information is determined as the dynamic code book.

A computer readable storage medium is provided according to another aspect of the present disclosure. The computer readable medium includes an executable instruction that, when executed by a computer, causes the computer to perform the wireless communication method according to the present disclosure.

With the electronic device, the wireless communication method and the computer readable storage medium according to the present disclosure, in a case where a partial HARQ processes between a network side device and a user equipment are configured to not transmit feedback information, the network side device may configure a type of a code book for the user equipment, and a default value of the type of the code book is the dynamic code book. In this way, the information redundancy and the waste of resources caused by the use of the semi-persistent code book by user equipment can be avoided.

Further applicability areas are become apparent from the description provided herein. The description and specific examples in the summary are only schematic and are not intended to limit the scope of the present disclosure.

BRIEF DESCRIPTION OF THE DRAWINGS

Drawings described herein are only schematic for described embodiments, rather than all embodiments, and are not intended to limit the scope of the present disclosure. In the drawing:

FIG. 1 is a schematic structural diagram of a semi-persistent code book;

FIG. 2 is a schematic diagram showing a configuration of time domain resource allocation (TDRA);

FIG. 5 is a schematic diagram showing reservation of feedback information of a semi-persistent code book in a case where a HARQ process is bound with a component carrier (CC) for transmitting a PDSCH carried by the HARQ process according to an embodiment of the present disclosure;

FIG. 6 is a schematic diagram showing reservation of feedback information of a semi-persistent code book in a case where a HARQ process is bound with a code block group (CBG) for transmitting a PDSCH carried by the HARQ process according to the embodiment of the present disclosure;

Figure 3:
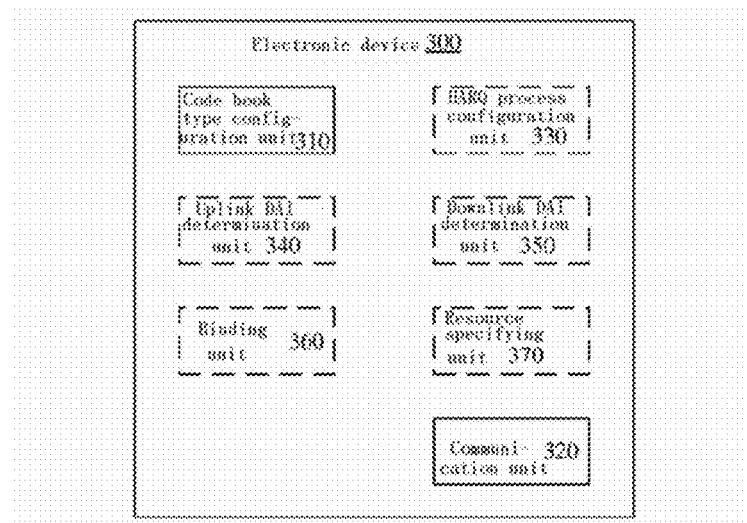
FIG. 3 is a block diagram showing a configuration example of an electronic device as a network side device according to an embodiment of the present disclosure.

While the present disclosure is susceptible to various modifications and alternative forms, specific embodiments thereof have been shown by way of example in the drawings and are herein described in detail. It should be understood that the description for the specific embodiments herein is not intended to limit the present disclosure to the disclosed specific forms, but on the contrary, the present disclosure is intended to encompass all modifications, equivalents and alternatives that fall within the spirit and scope of the present disclosure. It should be noted that, reference numerals indicate parts corresponding to the reference numerals throughout the drawings.

DETAILED DESCRIPTION OF EMBODIMENTS

Examples of the present disclosure are described more fully with reference to the drawings. The following description is merely exemplary rather than being intended to limit the present disclosure and applications or uses of the present disclosure.

Exemplary embodiments are provided to make the present disclosure be exhaustive and fully convey the scope of the present disclosure to those skilled in the art. Various specific details such as specific parts, devices and methods are set forth to provide thorough understanding for the embodiments of the present disclosure. It is apparent to those skilled in the art that the exemplary embodiments may be embodied in many different forms without the specific details, and the specific details are not interpreted as a limit for the scope of the present disclosure. In some exemplary embodiments, well-known processes, well-known structures and well-known technology are not described in detail.

Hereinafter, the present disclosure is described according to the following sequence.

1. Description of Scenarios.
2. Configuration Examples of Network Side Device.
3. Configuration Examples of User Equipment.
4. Method Embodiments.
5. Application Examples.

1. Description of Scenarios

In a case where a user equipment transmits feedback information using a semi-persistent code book, the user equipment reserves a position for transmitting the feedback information with respect to each time domain resource unit for transmitting downlink information, such as TDRA, each frequency domain resource unit, such as a CC, and/or each time-frequency resource unit, such as a CBG. In a case where a partial or all HARQ processes between the network side device and the user equipment are configured to not transmit feedback information, information redundancy and the waste of resources occur.

Figures 1, 2:
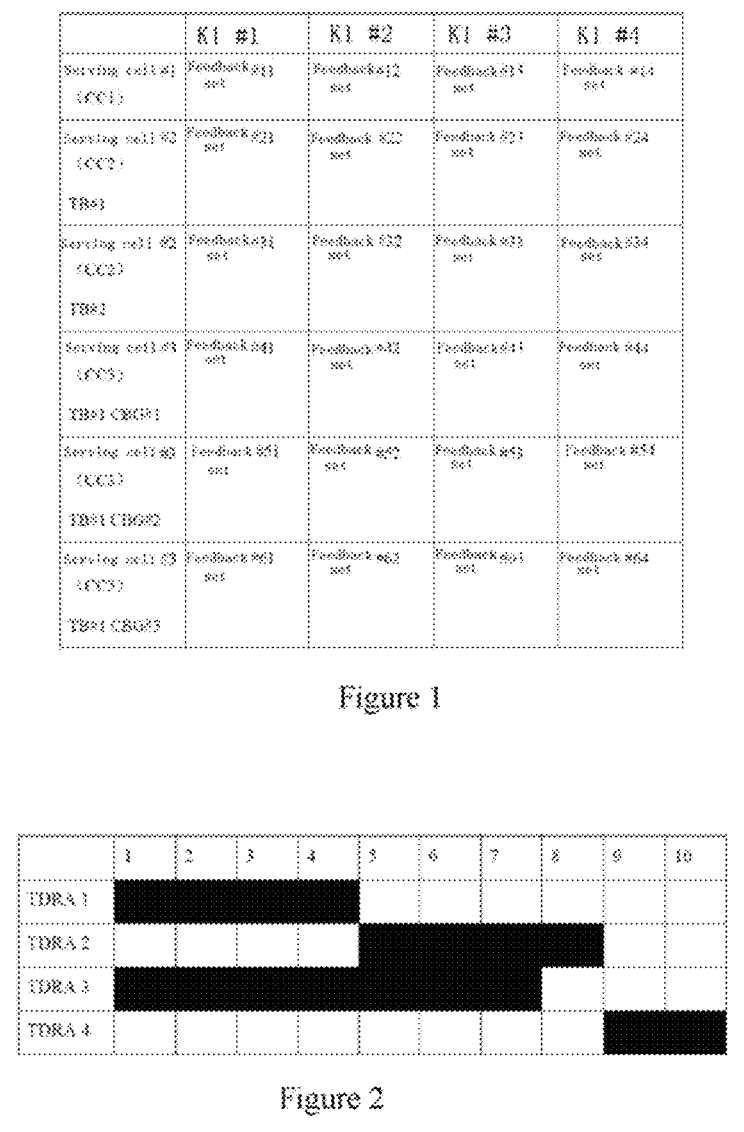

FIG. 1 is a schematic structural diagram of a semi-persistent code book. As shown in FIG. 1, a size of the semi-persistent code book is determined by parameters, such as a range of K1, the number of a serving cell or a CC supported by the user equipment, and a configuration of TDRA. Here, K1 represents a time difference between a PDCCH for scheduling a dynamic PDSCH or a semi-persistent scheduling (SPS) release signaling and feedback information with respect to the dynamic PDSCH, or represents a time difference between a scheduled SPS PDSCH and feedback information with respect to the SPS PDSCH, in time slot. That is, K1 actually represents transmission time period of the feedback information. FIG. 1 shows a semi-persistent code book in a case where K1 has four values. Further, a vertical axis in FIG. 1 represents a serving cell or a CC supported by the user equipment (or represents a combination of the serving cell or the CC supported by the user equipment and time-frequency resources). Here, the time-frequency resources may include a transmission block (TB), a code block (CB) and a CBG. In addition, parameters such as a band width part (BWP) and a sub-band may replace the serving cell or the CC to represent frequency domain resources. As shown in FIG. 1, the user equipment is required to reserve a feedback set for transmitting feedback information with respect to each of values of K1 and each serving cell or CC (or with respect to combination of the serving cell or the CC supported by the user equipment and the time-frequency resources). For example, a feedback set #11 represents a feedback set in a case where K1 is equal to #1 and CC1 is the frequency domain resources for transmitting the downlink information. A size of the feedback set is related to the TDRA configured for the user equipment.

FIG. 2 is a schematic diagram showing a configuration of TDRA. In FIG. 2, a horizontal axis represents time domain, and each grid represents one OFDM symbol. The TDRA is used to represent which OFDM symbols in one time slot are used to transmit a PDSCH. In other words, the TDRA may represent time domain resources for transmitting the PDSCH. For example, for TDRA1, a first to a fourth OFDM symbols in the time slot are used to transmit the PDSCH. For TDRA2, a fifth to an eighth OFDM symbols in the time slot are used to transmit the PDSCH. For TDRA3, the first to a seventh OFDM symbols in the time slot are used to transmit the PDSCH. For TDRA4, a ninth to a tenth OFDM symbols in the time slot are used to transmit the PDSCH. For convenience of description, FIG. 2 only shows an example of 10 OFDM symbols in the time slot. In an actual system, each time slot may include, for example, 14 OFDM symbols. The user equipment may determine a size of each feedback set in FIG. 1 according to the configuration of the TDRA. For example, the size of the feedback set represents the number of the configuration of the TDRA that can be used simultaneously by the user equipment, and content of the feedback set represents feedback information of each of the configurations of the TDRA that can be used simultaneously. Here, if two or more configurations of the TDRA are not overlapped each other in the time domain, the user equipment may use the two or more configurations of the TDRA simultaneously. For example, in the example shown in FIG. 2, if the user equipment is configured with the TDRA1 and the TDRA2, it may be seen from FIG. 2 that the two configurations of the TDRA are not overlapped each other in the time domain, that is, the user equipment may use the TDRA1 and the TDRA2 simultaneously. Therefore, the size of the feedback set is equal to 2, that is, the feedback set includes 2 bits, which respectively represent feedback information for the TDRA1 and feedback information for the TDRA2. For another example, if the user equipment is configured with the TDRA1 and the TDRA3, it may be seen from FIG. 2 that the two configurations of the TDRA are overlapped each other (that is, for the TDRA1 and the TDRA3, the first to the fourth OFDM symbols are used to transmit the PDSCH) in the time domain, indicating that the user equipment cannot use the TDRA1 and the TDRA3 simultaneously. In other words, the user equipment can only use one of the TDRA1 and the TDRA3. Therefore, the size of the feedback set is equal to 1, that is, the feedback set includes 1 bit, which represents the feedback information for the TDRA1 or feedback information for the TDRA3. As another example, if the user equipment is configured with the TDRA1, the TDRA2 and the TDRA4, it may be seen from FIG. 2 that the three configurations of the TDRA are not overlapped each other in time domain, that is, the user equipment may use the TDRA1, the TDRA2 and the TDRA4 simultaneously. Therefore, the size of the feedback set is equal to 3, that is, the feedback set includes 3 bits, which respectively represent the feedback information for the TDRA1, the feedback information for the TDRA2, and feedback information for TDRA4.

It can be seen that for the semi-persistent code book, the user equipment reserves bit positions for transmitting feedback information for each K1, each frequency domain resource (or time-frequency resource) and each of the configurations of the TDRA that can be used to transmit simultaneously. In a case where a partial or all HARQ processes between the network side device and the user equipment are not required to transmit the feedback information, a large amount of information redundancy and the waste of resources occur.

In a case where the user equipment transmits feedback information by using a dynamic code book, a size of the dynamic code book changes at any time according to real scheduling of the PDSCH by the network side device, so that no information redundancy occurs. However, in a case where the user equipment transmits feedback information by using the dynamic code book, the network side device may determine a downlink assignment indicator (DAI) value for uplink assignment and a DAI value for downlink assignment according to the number of the PDSCH and the number of a SPS release signaling, so that the user equipment may be prevented from missing PDCCH detection and determine the number of to-be feedback. In a case where a partial or all HARQ processes between the network side device and the user equipment are configured to not transmit feedback information, if the network side device determines the DAI value for uplink assignment and the DAI value for downlink assignment by the above way, such the values have no reference significance for the user equipment.

For such a scenario, an electronic device in a wireless communication system, a wireless communication method performed by the electronic device in the wireless communication system and a computer-readable storage medium are provided according to the present disclosure, to improve the HARQ feedback process in a case where all or a partial HARQ processes between the network side device and the user equipment are not required to transmit the feedback information.

2. Configuration Examples of Network Side Device

FIG. 3 is a block diagram showing a configuration example of an electronic device 300 according to an embodiment of the present disclosure. The electronic device 300 may serve as a network side device in a wireless communication system, specifically, serving as a base station device in the wireless communication system.

As shown in FIG. 3, the electronic device 300 may include a code book type configuration unit 310 and a communication unit 320.

Here, units of the electronic device 300 may be included in a processing circuitry. It should be noted that, the electronic device 300 may include one or more processing circuitry. Further, the processing circuitry may include various discrete functional units to perform different functions and/or operations. It should be noted that these functional units may be physical entities or logical entities, and units with different names may be implemented by a same physical entity.

According to an embodiment of the present disclosure, in a case where a partial HARQ processes between the electronic device 300 and a user equipment are configured to not transmit feedback information, the code book type configuration unit 310 may configure a type of a code book of the user equipment which is used for transmitting feedback information as a dynamic code book or a semi-persistent code book.

According to an embodiment of the present disclosure, the electronic device 300 may transmit information representing the type of the code book to the user equipment via the communicating unit 320.

According to an embodiment of the present disclosure, the code book type configuration unit 310 configures a default value of the type of the code book as the dynamic code book, so that in a case where the user equipment receives no information representing the type of the code book from the electronic device 300, the type of the code book which is used for transmitting feedback information is determined as the dynamic code book.

As described above, in the electronic device 300 according to the embodiment of the present disclosure, in a case where a partial HARQ processes between the electronic device 300 and the user equipment are configured to not transmit feedback information, the electronic device 300 may configure the type of the code book for the user equipment. The default value of the type of the code book is the dynamic code book. In this way, the information redundancy and the waste of resources caused by the use of the semi-persistent code book by user equipment can be avoided.

According to an embodiment of the present disclosure, as shown in FIG. 3, the electronic device 300 may further include a HARQ process configuration unit 330. The HARQ process configuration unit 330 is configured to configure each HARQ process between the electronic device 300 and the user equipment, including configuring whether the HARQ process is required to transmit feedback information. According to an embodiment of the present disclosure, the electronic device 300 may transmit information about whether each HARQ process is required to transmit feedback information to the user equipment through radio resource control (RRC) signaling. Alternatively, the electronic device 300 may further transmit the information about whether each HARQ process is required to transmit feedback information to the user equipment through downlink control information (DCI) or media access control (MAC) control element (CE). Therefore, the electronic device 300 may determine whether each of the one or more HARQ processes between the electronic device 300 and the user equipment is configured to not transmit feedback information or to transmit the feedback information, so as to configure a type of a code book in a case where part of the one or more HARQ processes are configured to not transmit feedback information.

According to an embodiment of the present disclosure, the electronic device 300 may transmit information representing the type of the code book through the RRC signaling.

An embodiment in which the type of the code book is configured as a dynamic code book is described in detail hereinafter. A method for determining a DAI value in a case where a partial HARQ processes between the network side device and the user equipment are configured to not transmit feedback information is provided according to the present disclosure.

As shown in FIG. 3, the electronic device 300 may further include an uplink DAI determination unit 340 and a downlink DAI determination unit 350. The uplink DAI determination unit 340 may determine a DAI value for uplink assignment, and the downlink DAI determination unit 350 may determine a DAI value for downlink assignment. Further, the electronic device 300 may transmit the DAI value for uplink assignment determined by the uplink DAI determination unit 340 to the user equipment through DCI. For example, the electronic device 300 may transmit the DAI value for uplink assignment to the user equipment through DCI for uplink assignment every time the user equipment requests to schedule a PUSCH. In addition, the electronic device 300 may transmit the DAI value for downlink assignment determined by the downlink DAI determination unit 350 to the user equipment through DCI for downlink assignment. For example, the electronic device 300 may transmit the DAI value for downlink assignment to the user equipment every time the electronic device 300 schedules a PDSCH.

According to an embodiment of the present disclosure, the uplink DAI determination unit 340 and the downlink DAI determination unit 350 may respectively determine the DAI value for uplink assignment and the DAI value for downlink assignment according to the numbers of a PDSCH, SPS activation signaling and SPS release signaling of feedback information to be transmitted by the user equipment. Here, the PDSCH may include a dynamic scheduling PDSCH and a SPS PDSCH when determining the DAI value for uplink assignment, and the PDSCH may include the dynamic scheduling PDSCH when determining the DAI value for downlink assignment.

According to an embodiment of the present disclosure, in a case where the HARQ process is configured to transmit feedback information, a PDSCH carried by the HARQ process is required to transmit the feedback information. In a case where the HARQ process is configured to not transmit feedback information, the PDSCH carried by the HARQ process is not required to transmit the feedback information. Therefore, the uplink DAI determination unit 340 may determine whether each HARQ process is required to transmit feedback information according to a result configured by the HARQ process configuration unit 330, so as to determine the numbers of the dynamic scheduling PDSCH and the SRS PDSCH of the feedback information to be transmitted. In addition, the downlink DAI determination unit 350 may determine whether each HARQ process is required to transmit feedback information according to a result configured by the HARQ process configuration unit 330, so as to determine the number of the dynamic scheduling PDSCH of the feedback information to be transmitted.

In can be seen that according to the embodiment of the present disclosure, in a case where the type of the code book is configured as a dynamic code book, the uplink DAI determination unit 340 may determine a DAI value for uplink assignment according to the number of a PDSCH carried by a HARQ process configured to transmit feedback information. The PDSCH includes a dynamic scheduling PDSCH and a semi-persistent scheduling PDSCH. Further, the downlink DAI determination unit 350 may determine a DAI value for downlink assignment according to the number of a PDSCH carried by the HARQ process configured to transmit feedback information. The PDSCH includes the dynamic scheduling PDSCH. In this way, only the number of the PDSCH carried by the HARQ process configured to transmit feedback information is considered when the DAI value for downlink assignment and the DAI value for uplink assignment are determined, so that the user equipment may determine the number of feedback information to be transmitted, and can be prevented from missing PDCCH detection.

According to an embodiment of the present disclosure, the PDSCH may be dynamically scheduled or semi-persistently scheduled. The semi-persistent scheduling PDSCH may further be described as the SPS PDSCH. For the SPS PDSCH, the electronic device 300 may configure resources for the SPS PDSCH through RRC signaling, and then activate and release the resources through a PDCCH. The signaling for activating the SPS PDSCH may be described as SPS activation signaling, and the signaling for releasing the SPS PDSCH may be described as SPS release signaling. The electronic device 300 may transmit the SPS activation signaling and the SPS release signaling through a PDCCH. Since the HARQ process is generally used to carry a PDSCH, the SPS activation signaling and the SPS release signaling does not require the HARQ process to carry. In general, a serial number of the HARQ process of the SPS activation signaling and/or the SPS release signaling is considered to be the same as a serial number of the HARQ process of the SPS PDSCH corresponding to the SPS activation signaling and/or the SPS release signaling.

According to an embodiment of the present disclosure, for the SPS release signaling, whether the SPS PDSCH corresponding to the SPS release signaling is configured to transmit feedback information or not transmit feedback information, the user equipment is required to feed back the SPS release signaling, that is, generate feedback information for the SPS release signaling and transmit the feedback information to the electronic device 300.

According to an embodiment of the present disclosure, the uplink DAI determination unit 340 may determine the DAI value for uplink assignment according to the number of SPS release signaling (including SPS release signaling corresponding to the SPS PDSCH carried by the HARQ process configured to transmit feedback information and SPS release signaling corresponding to the SPS PDSCH carried by the HARQ process configured to not transmit feedback information). The downlink DAI determination unit 340 may determine the DAI value for downlink assignment according to the number of SPS release signaling (including SPS release signaling corresponding to the SPS PDSCH carried by the HARQ process configured to transmit feedback information and SPS release signaling corresponding to the SPS PDSCH carried by the HARQ process configured to not transmit feedback information).

As described above, according to the embodiment of the present disclosure, the user equipment is required to feed back the SPS release signaling. Therefore, the electronic device 300 may determine whether the SPS release signaling is successfully received, that is, it may be determined whether SPS PDSCH resources are successfully released. Further, the electronic device 300 may determine the DAI value according to the number of SPS release signaling, so that the user equipment may determine the number of feedback information to be transmitted, and can be prevented from missing PDCCH detection.

According to an embodiment of the present disclosure, for the SPS activation signaling, in a case where a SPS PDSCH corresponding to the SPS activation signaling is configured to transmit feedback information, even if the user equipment does not generate feedback information for the SPS activation signaling, the electronic device 300 may determine whether the user equipment successfully receives the SPS activation signaling and successfully activates the SPS PDSCH corresponding to the SPS activation signaling through subsequent feedback information of the user equipment to the SPS PDSCH corresponding to the SPS activation signaling. Therefore, according to the embodiment of the present disclosure, in a case where the SPS PDSCH corresponding to the SPS activation signaling is configured to transmit feedback information, the user equipment may not feed back the SPS activation signaling, that is, the user equipment may not be required to generate feedback information for the SPS activation signaling. Further, in a case where the SPS PDSCH corresponding to the SPS activation signaling is configured to not transmit feedback information, if the user equipment does not generate feedback information for the SPS activation signaling, the electronic device 300 may not determine whether the user equipment successfully receives the SPS activation signaling and successfully activates the SPS PDSCH corresponding to the SPS activation signaling. Therefore, according to the embodiment of the present disclosure, for the SPS activation signaling, in a case where the SPS PDSCH corresponding to the SPS activation signaling is configured to not transmit feedback information, the user equipment is required to feed back the SPS activation signaling.

According to an embodiment of the present disclosure, the uplink DAI determination unit 340 may determine the DAI value for uplink assignment according to the number of a SPS activation signaling corresponding to the SPS PDSCH carried by the HARQ process configured to not transmit feedback information. The downlink DAI determination unit 340 may determine the DAI value for downlink assignment according to the number of the SPS activation signaling corresponding to the SPS PDSCH carried by the HARQ process configured to not transmit feedback information.

As described above, according to the embodiment of the present disclosure, the user equipment is required to feed back the SPS activation signaling corresponding to the SPS PDSCH carried by the HARQ process is configured to not transmit feedback information. Therefore, the electronic device 300 may determine whether the SPS activation signaling is successfully received, that is, the electronic device 300 may determine whether the SPS PDSCH resources are successfully activated. Further, the electronic device 300 may determine the DAI value according to the number of SPS activation signaling to be fed back, so that the user equipment may determine the number of feedback information to be transmitted, and can be prevented from missing PDCCH detection.

In summary, according to the embodiment of the present disclosure, the uplink DAI determination unit 340 may determine the DAI value for uplink assignment according to the numbers of the dynamic scheduling PDSCH and the semi-persistent scheduling PDSCH which are carried by the HARQ process configured to transmit feedback information, and the numbers of the SPS release signaling (including the SPS release signaling corresponding to the SPS PDSCH carried by the HARQ process configured to transmit feedback information and the SPS release signaling corresponding to the SPS PDSCH carried by the HARQ process configured to not transmit feedback information), and the number of the SPS activation signaling corresponding to the SPS PDSCH carried by the HARQ process configured to not transmit feedback information. Further, the downlink DAI determination unit 350 may determine the DAI value for downlink assignment according to the number of the dynamic scheduling PDSCH which is carried by the HARQ process configured to transmit feedback information, the number of the SPS release signaling (including the SPS release signaling corresponding to the SPS PDSCH carried by the HARQ process configured to transmit feedback information and the SPS release signaling corresponding to the SPS PDSCH carried by the HARQ process configured to not transmit feedback information), and the number of the SPS activation signaling corresponding to the SPS PDSCH carried by the HARQ process configured to not transmit feedback information.

According to an embodiment of the present disclosure, in a case where the user equipment has multiple CCs, the DAI value for downlink assignment may include a counter DAI (cDAI) value and a total DAI (tDAI) value. For both the cDAI and tDAI, the downlink DAI determination unit 340 may count by using the embodiments described above, the difference is that the cDAI and tDAI represent different meanings. Here, the cDAI represents sequential counting for a PDSCH, SPS release signaling or SPS activation signaling that are required to be fed back on each of the CCs and each time slot. That is, the cDAI represents a sum (for example, counting from 0) of the numbers of the PDSCH, the SPS release signaling or the SPS activation signaling that are required to be fed back so far a current CC and a current time slot. The tDAI represents a sum (for example, counting from 0) of the PDSCH, the SPS release signaling or the SPS activation signaling that are required to be fed back on each of the CCs so far the current time slot.

Figure 4:
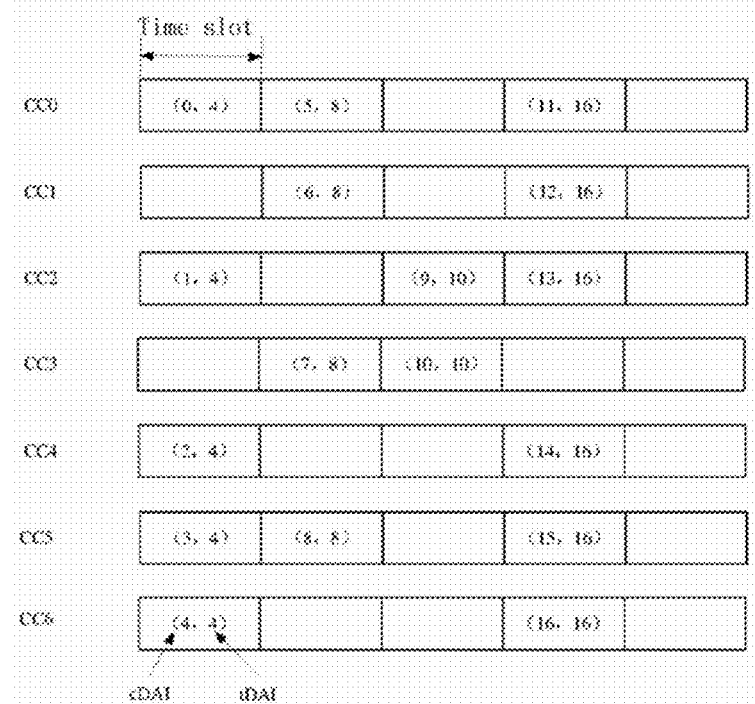
FIG. 4 is a schematic diagram showing a counter downlink assignment indicator (cDAI) and a downlink assignment indicator (tDAI) according to an embodiment of the present disclosure.

FIG. 4 is a schematic diagram showing a cDAI and a tDAI according to an embodiment of the present disclosure. As shown in FIG. 4, the user equipment has seven CCs numbered from CC0 to CC6. A horizontal axis represents time domain, in time slot. Both the cDAI and the tDAI count from 0. In a first time slot, a downlink PDSCH or PDCCH to be fed back is scheduled on CC0, CC2, CC4, CC5 and CC6. Therefore, the cDAI is counted from 0 to 4. Since the cDAI is counted to 4 so far the first time slot, the tDAI value in the first time slot is equal to 4. Similarly, in a second time slot, the downlink PDSCH or PDCCH to be fed back is scheduled on CC0, CC1, CC3 and CC5. Therefore, the cDAI is counted from 5 to 8. Since the cDAI is counted to 8 so far the second time slot, the tDAI value in the second time slot is equal to 8, and so on. In this way, the user equipment may determine whether missed detection occurs through the cDAI and tDAI.

According to an embodiment of the present disclosure, in a case where the user equipment has one CC, the DAI value for downlink assignment may include only cDAI and no tDAI. Alternatively, in a case where the user equipment has one CC, the DAI value for downlink assignment may further include cDAI and tDAI. In such case, the tDAI may represent the number of the PDSCH carried by the HARQ process configured to not transmit feedback information. In this way, even if the UE does not perform cyclic redundancy check (CRC) detection on the PDSCH, the UE may determine whether missing detection and wrong transmission of the PDSCH occur, so as to report to the electronic device 300.

As described above, according to the embodiment of the present disclosure, in a case where a partial HARQ processes between the electronic device 300 and the user equipment are configured to not transmit feedback information, the electronic device 300 may improve a method for determining the DAI value, so that the DAI value can reflect the numbers of the PDSCH, the SPS release signaling and the SPS activation signaling to be fed back.

According to the embodiment of the present disclosure, in a case where all HARQ processes between the electronic device 300 and the user equipment are configured to not transmit feedback information, the user equipment may not feed back the PDSCH, the SPS release signaling and the SPS activation signaling. That is, in such case, there is no DAI value. Alternatively, in a case where all HARQ processes between the electronic device 300 and the user equipment are configured to not transmit feedback information, the DAI value may further be retained. In such case, the DAI value represents the numbers of the PDSCH and the SPS release signaling which are carried by the HARQ process configured to not transmit feedback information. In this way, even if the UE does not perform CRC detection on the PDSCH, the UE may also determine whether missing detection and wrong transmission of the PDSCH occur, so as to report to the electronic device 300.

As described above, an improved method for a DAI value of a dynamic code book is actually provided according to the present disclosure, that is, the electronic device 300 may be configured to determine the DAI value for uplink assignment and the DAI value for downlink assignment according to the numbers of the PDSCH, the SPS release signaling and the SPS activation signaling that are required to be fed back. In this way, the DAI value is more accurate, so that the user equipment can be prevented from missing PDCCH detection and may determine the number of the feedback information to be transmitted. Here, the electronic device 300 may configure whether a PDSCH carried by each HARQ process is required to transmit feedback information, configure each SPS release signaling to transmit feedback information, and configure SPS activation signaling corresponding to the SPS PDSCH carried by the HARQ process that does not transmit feedback information to transmit feedback information. In particular, in a case where all HARQ processes between the electronic device 300 and the user equipment are configured to not transmit feedback information, the electronic device 300 may be configured to not transmit feedback information for all SPS activation signaling and SPS release information.

An embodiment in which a type of the code book is configured as a semi-persistent code book is described in detail hereinafter.

According to an embodiment of the present disclosure, as shown in FIG. 3, the electronic device 300 may further include a binding unit 360. The binding unit 360 is configured to bind the HARQ process that is required to transmit feedback information with resources for transmitting a PDSCH carried by the HARQ process in a case where the type of the code book is configured as the semi-persistent code book, that is, to determine a correspondence between the HARQ process that is required to transmit feedback information and the resources for transmitting the PDSCH carried by the HARQ process. That is, a HARQ that is required to transmit feedback information has a correspondence with the resources bound by the HARQ, that is, the HARQ process that is required to transmit feedback information calls the resources bound by the HARQ process to transmit the PDSCH carried by the HARQ process.

According to an embodiment of the present disclosure, the resources bound with the HARQ process may be time domain resources, frequency domain resources, or time domain and frequency domain resources.

According to an embodiment of the present disclosure, the binding unit 360 may bind the HARQ process that is required to transmit feedback information with time domain resources for transmitting the PDSCH carried by the HARQ process, that is, to determine a correspondence between the HARQ process that is required to transmit feedback information and the time domain resources for transmitting the PDSCH carried by the HARQ process. The time domain resources may determine a location of resources in the time domain, including but not limited to TDRA, a sub-frame, a time slot, a sub-slot, and an OFDM symbol. For example, assuming that a HARQ #1 process numbered 1 is configured to transmit feedback information, the binding unit 360 may bind the HARQ #1 with TDRA4 shown in FIG. 2, that is, HARQ #1 only schedules the time domain resources determined by the TDRA4 to transmit the PDSCH.

According to an embodiment of the present disclosure, in a case where the HARQ process is bound with the time domain resources for transmitting the PDSCH carried by the HARQ process, the user equipment may reserve a location of resources for transmitting feedback information only for the time domain resources in the semi-persistent code book. For example, in the example described above, if the user equipment is configured with TDRA1, TDRA 2 and TDRA 4 shown in FIG. 2, the size of the feedback set is equal to 3, that is, the feedback set includes 3 bits, which respectively represent feedback information for the TDRA1, feedback information for the TDRA2, and feedback information for TDRA4. According to an embodiment of the present disclosure, if the binding unit 360 binds the HARQ #1 that is required to transmit feedback information with the TDRA4 shown in FIG. 2, the HARQ #1 calls time domain resources determined by the TDRA4 to transmit the PDSCH. Therefore, the size of the feedback set may be reduced to 1, that is, the feedback set includes 1 bit, which represents the feedback information for TDRA4. It can be seen that the user equipment reserves a location of resources for transmitting feedback information only for the TDRA4 in the semi-persistent code book, which can greatly reduce the redundancy of information and avoid the waste of resources.

According to an embodiment of the present disclosure, the binding unit 360 may bind the HARQ process that is required to transmit feedback information with frequency domain resources for transmitting the PDSCH carried by the HARQ process, that is, to determine a correspondence between the HARQ process that is required to transmit feedback information and the frequency domain resources for transmitting the PDSCH carried by the HARQ process. The frequency domain resources may determine a location of resources in the frequency domain, including but not limited to a component carrier (CC), a band width part (BWP) and a sub-band. For example, assuming that a HARQ #1 process numbered 1 is configured to transmit feedback information, the binding unit 360 may bind the HARQ #1 with CC1, that is, HARQ #1 only schedules the frequency domain resources determined by the CC1 to transmit the PDSCH.

According to an embodiment of the present disclosure, in a case where the HARQ process is bound with the frequency domain resources for transmitting the PDSCH carried by the HARQ process, the user equipment may reserve a location of resources for transmitting feedback information only for the frequency domain resource in the semi-persistent code book. For example, in the example described above, the user equipment reserves a location of resources for transmitting feedback information for each CC in the semi-persistent code book. According to an embodiment of the present disclosure, in a case where HARQ #1 that is required to transmit feedback information is bound with CC1, the user equipment reserves a location of resources for transmitting feedback information only for CC1 in the semi-persistent code book. In this way, the redundancy of information can be greatly reduced and the waste of resources can be avoided.

Figures 5, 6:
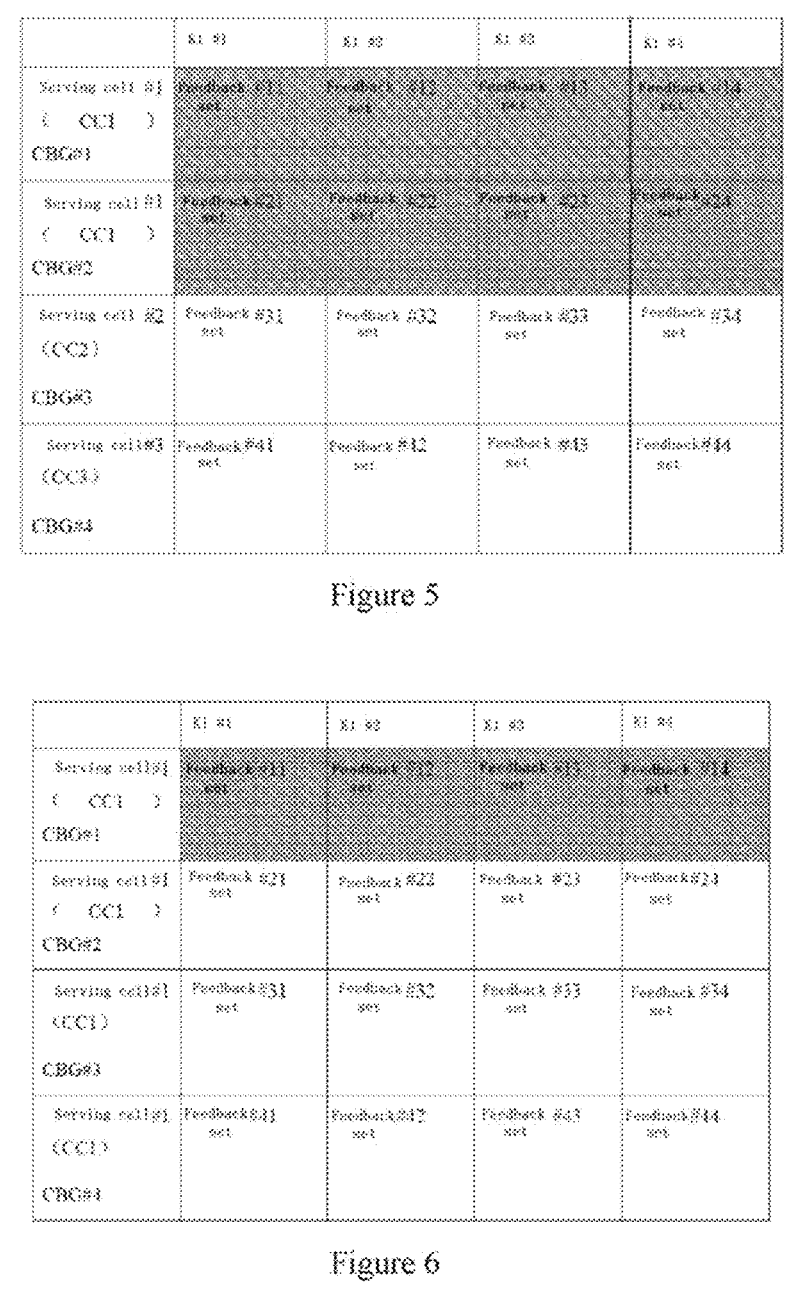

FIG. 5 is a schematic diagram showing reservation of feedback information of a semi-persistent code book in a case where a HARQ process is bound with a CC for transmitting a PDSCH carried by the HARQ process according to an embodiment of the present disclosure. As shown in FIG. 5, a first row represents a feedback set in a case where the PDSCH is transmitted by using CC1 and CBG #1, a second row represents a feedback set in a case where the PDSCH is transmitted by using CC1 and CBG #2, a third row represents a feedback set in a case where the PDSCH is transmitted by using CC2 and CBG #3, and a fourth row represents a feedback set in a case where the PDSCH is transmitted by using CC3 and CBG #4. A gray section in FIG. 5 represents a location of resources for transmitting feedback information reserved by the user equipment in the semi-persistent code book in a case where HARQ #1 is bound with CC1. As shown in FIG. 5, the user equipment is only required to transmit feedback information included in a feedback set #11, a feedback set #21, a feedback set #12, a feedback set #22, a feedback set #13, a feedback set #23, a feedback set #14 and a feedback set #24 to the electronic device 300.

According to an embodiment of the present disclosure, the binding unit 360 may bind the HARQ process that is required to transmit feedback information with the time domain resources and the frequency domain resources for transmitting the PDSCH carried by the HARQ process, that is, to determine correspondences between the HARQ process that is required to transmit feedback information and the time domain resources and the frequency domain resources for transmitting the PDSCH carried by the HARQ process. The time domain resources and the frequency domain resources may determine locations of resources in the time domain and the frequency domain, including but not limited to a code block group (CBG), a code block (CB), and a transmission block (TB). For example, assuming that a HARQ #1 process numbered 1 is configured to transmit feedback information, the binding unit 360 may bind the HARQ #1 with CBG #1, that is, HARQ #1 only schedules the time domain resources and the frequency domain resources determined by the CBG #1 to transmit the PDSCH.

According to an embodiment of the present disclosure, in a case where the HARQ process is bound with the time domain resources and the frequency domain resources for transmitting the PDSCH carried by the HARQ process, the user equipment may reserve a location of resources for transmitting feedback information only for the time domain resource and the frequency domain resource in the semi-persistent code book. For example, according to the conventional standard, the user equipment reserves a location of resources for transmitting feedback information for each CBG in the semi-persistent code book. According to an embodiment of the present disclosure, in a case where HARQ #1 is bound with CBG #1, the user equipment reserves a location of resources for transmitting feedback information only for CBG #1 in the semi-persistent code book. In this way, the redundancy of information can be greatly reduced and the waste of resources can be avoided.

FIG. 6 is a schematic diagram showing reservation of feedback information of a semi-persistent code book in a case where a HARQ process is bound with a CBG for transmitting a PDSCH carried by the HARQ process according to the embodiment of the present disclosure. As shown in FIG. 6, a first row represents a feedback set in a case where the PDSCH is transmitted by using CC1 and CBG #1, a second row represents a feedback set in a case where the PDSCH is transmitted by using CC1 and CBG #2, a third row represents a feedback set in a case where the PDSCH is transmitted by using CC1 and CBG #3, and a fourth row represents a feedback set in a case where the PDSCH is transmitted by using CC1 and CBG #4. A gray section in FIG. 6 represents a location of resources for transmitting feedback information reserved by the user equipment in the semi-persistent code book in a case where HARQ #1 is bound with CBG1. As shown in FIG. 6, the user equipment is only required to transmit feedback information included in a feedback set #11, a feedback set #12, a feedback set #13 and a feedback set #14 to the electronic device 300.

As described above, according to the embodiment of the present disclosure, in a case where the type of the code book is configured as the semi-persistent code book, the binding unit 360 may bind the HARQ process that is required to transmit feedback information with the resources for transmitting the PDSCH carried by the HARQ process, so that the user equipment reserves a location of the resources for transmitting feedback information only for the bound resources in the semi-persistent code book, thereby reducing the redundancy of information.

According to an embodiment of the present disclosure, as shown in FIG. 3, the electronic device 300 may further include a resource specifying unit 370. The resource specifying unit 370 is configured to specify, in a case where the type of the code book is configured as a semi-persistent code book, a part of resources for transmitting a PDSCH as resources that are required to transmit feedback information, so that when the electronic device 300 transmits downlink information to the user equipment utilizing the part of resources, the user equipment transmits feedback information with respect to the downlink information. That is, when the electronic device 300 is required to transmit a PDSCH requiring feedback information to the user equipment, the electronic device 300 transmits the PDSCH by using only the resources specified to be required to transmit feedback information, regardless of a HARQ process carrying the PDSCH. That is, in a case where a HARQ process (HARQ #1) numbered 1 is required to transmit feedback information, the electronic device 300 may schedule the resources specified to be required to transmit feedback information to transmit a PDSCH carried by the HARQ #1. In a case where a HARQ process (HARQ #2) numbered 2 is required to transmit feedback information, the electronic device 300 may schedule the resources specified to be required to transmit feedback information to transmit a PDSCH carried by the HARQ #2. That is, the resource specifying unit 370 may specify a part of resources as resources for transmitting a PDSCH carried by a HARQ process that is required to transmit feedback information.

According to an embodiment of the present disclosure, the resources for transmitting a PDSCH include time domain resources, frequency domain resources, or time domain resources and time-frequency resources. Similarly, the time domain resources may determine a location of resources in the time domain, including but not limited to TDRA, a sub-frame, a time slot, a sub-slot and an OFDM symbol. The frequency domain resources may determine a location of resources in the frequency domain, including but not limited to a component carrier (CC), a band width part (BWP) and a sub-band. The time domain resources and the frequency domain resources may determine locations of resources in the time domain and the frequency domain, including but not limited to a code block group (CBG), a code block (CB) and a transmission block (TB).

For example, the resource specifying unit 370 may specify the TDRA4 as resources that are required to transmit feedback information, and the electronic device 300 may schedule time domain resources determined by the TDRA4 to transmit the PDSCH carried by the HARQ #1 that is required to transmit feedback information. In this way, the user equipment may reserve resources for transmitting feedback information only for the TDRA4 in the semi-persistent code book. That is, the size of the feedback set is equal to 1, that is, the feedback set includes 1 bit, which represents the feedback information for the TDRA4, thereby reducing the redundancy of information. As another example, the resource specifying unit 370 may specify CC1 as resource that are required to transmit feedback information, and the electronic device 300 may schedule frequency domain resources determined by the CC1 to transmit a PDSCH carried by the HARQ #1 that is required to transmit feedback information. In this way, the user equipment may reserve resources for transmitting feedback information only for the CC1 in the semi-persistent code book, thereby reducing the redundancy of information. As another example, the resource specifying unit 370 may specify the CBG #1 as resources that are required to transmit feedback information, and the electronic device 300 may schedule time domain resources and frequency domain resources determined by the CBG #1 to transmit the PDSCH carried by the HARQ #1 that is required to transmit feedback information. In this way, the user equipment may reserve resources for transmitting feedback information only for the CBG #1 in the semi-persistent code book, thereby reducing the redundancy of information.

As described above, according to the embodiment of the present disclosure, in a case where the type of the code book is configured as the semi-persistent code book, the resource specifying unit 370 may specify a part of the resources for transmitting a PDSCH as resources that are required to transmit feedback information, so as to transmit the PDSCH carried by the HARQ process that is required to transmit feedback information by using the part of the resources. Therefore, the user equipment may reserve a position of resources for transmitting feedback information only with respect to this part of resources in the semi-persistent code book, thereby reducing the redundancy of information.

As described above, according to the embodiment of the present disclosure, a method for reducing the redundancy of information in a case of a semi-persistent code book is actually provided according to the present disclosure. That is, in a case where a partial HARQ processes between the electronic device 300 and the user equipment are configured to not transmit feedback information, a HARQ process that is required to transmit feedback information may be bound with the resources for transmitting a PDSCH, so that the user equipment reserves a location of resources for transmitting feedback information only for the bound resources in the semi-persistent code book. Alternatively, in the case where a partial HARQ processes between the electronic device 300 and the user equipment are configured to not transmit feedback information, a part of the resources may be specified as resources for transmitting a PDSCH carried by the HARQ process that is required to transmit feedback information, so that the user equipment reserves a location of the resources for transmitting feedback information only for the specified resources in the semi-persistent code book. In summary, according to the embodiment of the present disclosure, the redundancy of information in a case where the feedback information is transmitted by using the semi-persistent code book can be greatly reduced and the waste of resources can be avoided.

3. Configuration Examples of User Equipment

Figure 7:
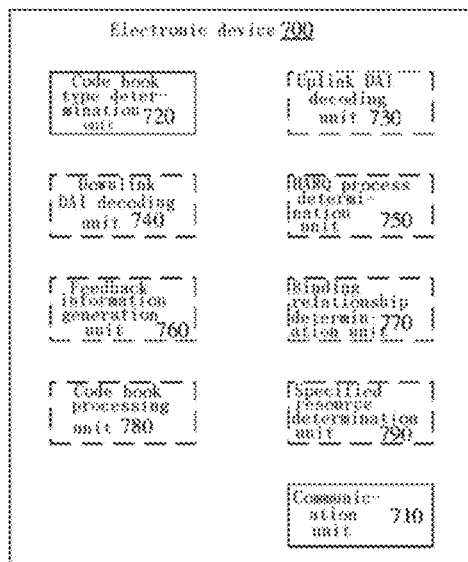
FIG. 7 is a block diagram showing a configuration example of an electronic device as a user equipment according to an embodiment of the present disclosure.

FIG. 7 is a block diagram showing a structure of an electronic device 700 as a user equipment in a wireless communication system according to an embodiment of the present disclosure. As shown in FIG. 7, the electronic device 700 may include a communication unit 710 and a code book type determination unit 720.

Here, units of the electronic device 700 may be included in processing circuitry. It should be noted that, the electronic device 700 may include one or more processing circuitry. Further, the processing circuitry may include various discrete functional units to perform different functions and/or operations. It should be noted that these functional units may be physical entities or logical entities, and units with different names may be implemented by a same physical entity.

According to an embodiment of the present disclosure, the electronic device 700 may receive information representing the type of the code book for transmitting feedback information from the network side device through the communication unit 710. The information is transmitted in a case where a partial HARQ processes between the network side device and the electronic device 700 is configured to not transmit feedback information.

According to an embodiment of the present disclosure, the code book type determination unit 720 may determine the type of the code book as a dynamic code book or a semi-persistent code book according to the received information.

According to an embodiment of the present disclosure, in a case where the electronic device 700 receives no the above information from the network side device, the code book type determination unit 720 may determine the type of the code book for transmitting feedback information as the dynamic code book.

It can be seen that according to the embodiment of the present disclosure, the electronic device 700 may determine whether the code book for transmitting feedback information is the dynamic code book or the semi-persistent code book according to the information representing the type of the code book for transmitting feedback information received from the network side device. Further, a default value of the type of the code book is the dynamic code book, which can avoid the redundancy of information and the waste of resources in a case that the semi-persistent code book is used.

According to an embodiment of the present disclosure, the electronic device 700 may receive the information representing the type of the code book for transmitting feedback information from the network side device through RRC signaling.

According to an embodiment of the present disclosure, as shown in FIG. 7, the electronic device 700 may further include an uplink DAI decoding unit 730 and a downlink DAI decoding unit 740 that are respectively configured to require the DAI value for uplink assignment and the DAI value for downlink assignment from the network side device in a case where the type of the code book is the dynamic code book. For example, the electronic device 700 may require the DAI value for uplink assignment through the DCI for uplink assignment, and require the DAI value for downlink assignment through the DCI for downlink assignment.

According to an embodiment of the present disclosure, the uplink DAI decoding unit 730 may decode the DCI for uplink assignment transmitted by the network side device to require the DAI value for uplink assignment. Here, the uplink DAI decoding unit 730 may determine a sum of the numbers of the dynamic scheduling PDSCH and the SPS PDSCH which are carried by the HARQ process configured to transmit feedback information, the numbers of the SPS release signaling corresponding to the SPS PDSCHs carried by the HARQ process configured to transmit feedback information and the HARQ process configured to not transmit feedback information, and the number of the SPS activation signaling corresponding to the SPS PDSCH carried by the HARQ process configured to not transmit feedback information according to the DAI value for uplink assignment.

According to an embodiment of the present disclosure, the downlink DAI decoding unit 740 may decode the DCI for downlink assignment transmitted by the network side device to require the DAI value for downlink assignment. Here, the downlink DAI decoding unit 740 may determine a sum of the number of the dynamic scheduling PDSCH carried by the HARQ process configured to transmit feedback information, the number of the SPS release signaling corresponding to the SPS PDSCHs carried by the HARQ process configured to transmit feedback information and the HARQ process configured to not transmit feedback information, and the number of the SPS activation signaling corresponding to the SPS PDSCH carried by the HARQ process configured to not transmit feedback information according to the DAI value for downlink assignment.

According to the embodiment of the present disclosure, the user equipment may determine the number of feedback information to be transmitted according to the DAI value for uplink assignment determined by the uplink DAI decoding unit 730, and may determine whether missed PDCCH detection occurs according to the DAI value for downlink assignment determined by the downlink DAI decoding unit 740.

According to an embodiment of the present disclosure, as shown in FIG. 7, the electronic device 700 may further include a HARQ process determination unit 750. The HARQ process determination unit 750 is configure to determine whether each HARQ process is required to transmit feedback information according to configuration information about each HARQ process received from the network side device.

According to an embodiment of the present disclosure, the electronic device 700 may further include a feedback information generation unit 760. The feedback information generation unit 760 is configured to generate feedback information for the PDSCH, the SPS activation signaling or the SPS release signaling that are required to transmit feedback information. Further, the electronic device 700 may transmit the generated feedback information to the network side device through the communication unit 710.

According to an embodiment of the present disclosure, for the SPS activation signaling corresponding to the SPS PDSCH carried by the HARQ process configured to not transmit feedback information, the feedback information generation unit 760 may generate feedback information and transmit the generated feedback information to the network side device through the communication unit 710. In this way, the network side device may determine whether the electronic device 700 successfully receives the SPS activation signaling. For the SPS activation signaling corresponding to the SPS PDSCH carried by the HARQ process configured to transmit feedback information, the electronic device 700 does not generate feedback information, and the network side device may determine whether the electronic device 700 successfully receives the SPS activation signaling through feedback information about the SPS PDSCH.

According to an embodiment of the present disclosure, for the SPS release signaling, the feedback information generation unit 760 generates feedback information whether the HARQ process carrying the SPS PDSCH corresponding to the SPS release signaling is configured to transmit feedback information or not transmit feedback information. Further, the electronic device 700 may transmit the generated feedback information to the network side device through the communication unit 710. In this way, the network side device may determine whether the electronic device 700 successfully receives the SPS release signaling, so as to determine whether resources of the SPS PDSCH corresponding to the SPS release signaling are released.

According to an embodiment of the present disclosure, the electronic device 700 may further receive binding information (which is further described as correspondence information in the present disclosure) from the network side device through the communication unit 710. The binding information includes a binding relationship (which is further described as a correspondence in the present disclosure) between the HARQ process that is required to transmit feedback information and resources for transmitting the PDSCH carried by the HARQ process.

According to an embodiment of the present disclosure, as shown in FIG. 7, the electronic device 700 may further include a binding relationship determination unit 770. The binding relationship determination unit 770 is configured to determine the binding relationship between the HARQ process that is required to transmit feedback information and the resources for transmitting the PDSCH carried by the HARQ process according to the received binding information.

According to an embodiment of the present disclosure, as shown in FIG. 7, the electronic device 700 may further include a code book processing unit 780. The code book processing unit 780 is configured to reserve a location of the resources for transmitting feedback information for the bound resources for transmitting the PDSCH carried by the HARQ process in the semi-persistent code book.

According to an embodiment of the present disclosure, in a case where the binding relationship determination unit 770 determines that the HARQ process that is required to transmit feedback information is bound with time domain resources for transmitting the PDSCH carried by the HARQ process, that is, in a case where there is a correspondence between the HARQ process that is required to transmit feedback information and the time domain resources for transmitting the PDSCH carried by the HARQ process, the code book processing unit 780 may reserve a location of the resources for transmitting feedback information with respect to the time domain resources in the semi-persistent code book. The time domain resources include but are not limited to TDRA, a sub-frame, a time slot, a sub-slot and an OFDM symbol. For example, in a case where the user equipment is configured with the TDRA1, the TDRA2 and the TDRA4 shown in FIG. 2 and the binding relationship determination unit 770 determines that the HARQ #1 that is required to transmit feedback information is bound with the TDRA4, the code book processing unit 780 may determine that the size of the feedback set is equal to 1, that is, the feedback set includes 1 bit, which represents the feedback information for the TDRA4. It can be seen that the code book processing unit 780 reserves a location of the resources for transmitting feedback information only for the TDRA4 in the semi-persistent code book, which can greatly reduce the redundancy of information and avoid the waste of resources.

According to an embodiment of the present disclosure, in a case where the binding relationship determination unit 770 determines that the HARQ process that is required to transmit feedback information is bound with frequency domain resources for transmitting the PDSCH carried by the HARQ process, that is, in a case where there is a correspondence between the HARQ process that is required to transmit feedback information and the frequency domain resources for transmitting the PDSCH carried by the HARQ process, the code book processing unit 780 may reserve a location of the resources for transmitting feedback information for the frequency domain resource in the semi-persistent code book. The frequency domain resources include but are not limited to a component carrier, a band width part (BWP) and a sub-band. For example, in a case where the binding relationship determination unit 770 determines that the HARQ #1 that is required to transmit feedback information is bound with the CC1, the code book processing unit 780 reserves a location of the resources for transmitting feedback information only for the CC1 in the semi-persistent code book. In this way, the redundancy of information can be greatly reduced and the waste of resources can be avoided.

According to an embodiment of the present disclosure, in a case where the binding relationship determination unit 770 determines that the HARQ process that is required to transmit feedback information is bound with the time domain resources and the frequency domain resources for transmitting the PDSCH carried by the HARQ process, that is, in a case where there are correspondences between the HARQ process that is required to transmit feedback information and the time domain resources and the frequency domain resources for transmitting the PDSCH carried by the HARQ process, the code book processing unit 780 may reserve a location of the resources for transmitting feedback information with respect to the time domain resources and the frequency domain resources in the semi-persistent code book. The time domain resources and the frequency domain resources include but are not limited to a code block group (CBG), a code block (CB), and a transmission block (TB). For example, in a case where the binding relationship determination unit 770 determines that the HARQ #1 that is required to transmit feedback information is bound with the CBG #1, the code book processing unit 780 reserves a location of the resources for transmitting feedback information only for the CBG #1. In this way, the redundancy of information can be greatly reduced and the waste of resources can be avoided.

As described above, according to the embodiment of the present disclosure, the binding relationship determination unit 770 may determine the binding relationship between the HARQ process that is required to transmit feedback information and the resources for transmitting the PDSCH carried by the HARQ process, and the code book processing unit 780 may reserve a location of the resources for transmitting feedback information for the bound resources in the semi-persistent code book, thereby reduce the redundancy of information.

According to an embodiment of the present disclosure, the electronic device 700 may acquire the resources for transmitting the PDSCH carried by the HARQ process that is required to transmit feedback information from the network side device through the communication unit 710. According to an embodiment of the present disclosure, as shown in FIG. 7, the electronic device 700 may further include a specified resource determination unit 790. The specified resource determination unit 790 is configured to determine resources specified for transmitting the PDSCH carried by the HARQ process that is required to transmit feedback information.

According to an embodiment of the present disclosure, the code book processing unit 780 may reserve a location of the resources for transmitting feedback information for the above specified resources among the resources for transmitting the PDSCH in the semi-persistent code book.

According to an embodiment of the present disclosure, the specified resources may be time domain resources, frequency domain resources, or the time domain resources and the frequency domain resources. Similarly, the time domain resources may determine a location of resources in the time domain, including but not limited to TDRA, a sub-frame, a time slot, a sub-slot, and an OFDM symbol. The frequency domain resources may determine a location of resources in the frequency domain, including but not limited to a component carrier (CC), a band width part (BWP) and a sub-band. The time domain resources and the frequency domain resources may determine a location of resources in the time domain and the frequency domain, including but not limited to a code block group (CBG), a code block (CB) and a transmission block (TB).

For example, if the specified resource determination unit 790 determines that the TDRA4 is specified as the resources to transmit feedback information, the code book processing unit 780 may reserve resources for transmitting feedback information only for the TDRA4 in the semi-persistent code book. That is, the size of the feedback set is equal to 1, that is, the feedback set includes 1 bit, which represents the feedback information for the TDRA4, thereby reduce the redundancy of information. As another example, if the specified resource determination unit 790 determines that the CC1 is specified as the resources to transmit feedback information, the code book processing unit 780 may reserve resources for transmitting feedback information only for the CC1 in the semi-persistent code book, thereby reducing the redundancy of information. As another example, if the specified resource determination unit 790 determines that the CBG #1 is specified as the resources to transmit feedback information, the code book processing unit 780 may reserve resources for transmitting feedback information only for the CBG #1 in the semi-persistent code book, thereby reducing the redundancy of information.

As described above, according to an embodiment of the present disclosure, the specified resource determination unit 790 may determine specified resources of the PDSCH carried by the HARQ process transmitting feedback information, so that the code book processing unit 780 may reserve resources for transmitting the feedback information for the specified resources in the semi-persistent code book, thereby reducing the redundancy of information.

According to an embodiment of the present disclosure, the HARQ process determination unit 750 may determine whether each HARQ process is required to transmit feedback information. Further, in a case where the HARQ process determination unit 750 determines that all HARQ processes corresponding to one or more component carriers are configured to not transmit feedback information, the code book processing unit 780 may reserve a location of the resources for transmitting feedback information with respect to other frequency domain resources other than the one or more component carriers in the semi-persistent code book. For example, in the example of the semi-persistent code book shown in FIG. 5, assuming that the HARQ process determination unit 750 determines that all HARQ processes corresponding to the CC1 are configured to not transmit feedback information, the code book processing unit 780 reserves a location of the resources for transmitting feedback information only with respect to the CC2 and the CC3 in the semi-persistent code book shown in FIG. 5, that is, only transmitting feedback information in a feedback set #31, a feedback set #41, a feedback set #32, a feedback set #42, a feedback set #33, a feedback set #43, a feedback set #34 and a feedback set #44.

According to an embodiment of the present disclosure, in a case where the HARQ process determination unit 750 determines that all HARQ processes between the electronic device 700 and the network side device are configured to not transmit feedback information, the electronic device 700 may not transmit feedback information to the network side device.

According to an embodiment of the present disclosure, the electronic device 300 may serve as the network side device, and the electronic device 700 may serve as the user equipment, that is, the electronic device 300 may provide a service for the electronic device 700, and thus all embodiments regarding the electronic device 300 described above are applicable hereto.

4. Method Embodiments

Figure 8:
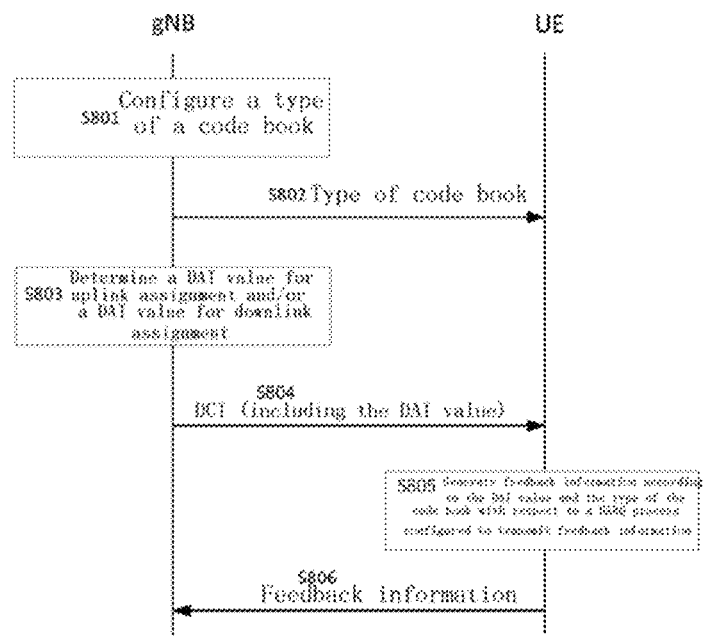
FIG. 8 is a signaling flow chart showing that a user equipment (UE) transmits feedback information in a case where a dynamic code book is configured according to an embodiment of the present disclosure.
Figure 9:
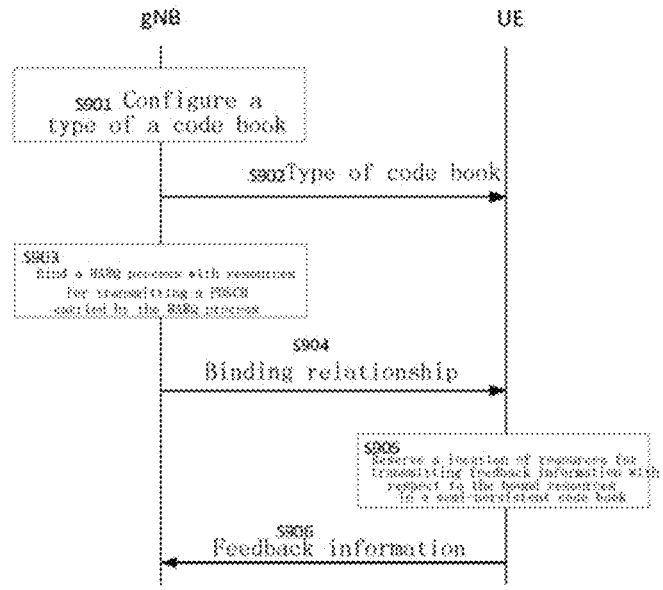
FIG. 9 is a signaling flow chart showing that a UE transmits feedback information in a case where a semi-persistent code book is configured according to an embodiment of the present disclosure.
Figure 10:
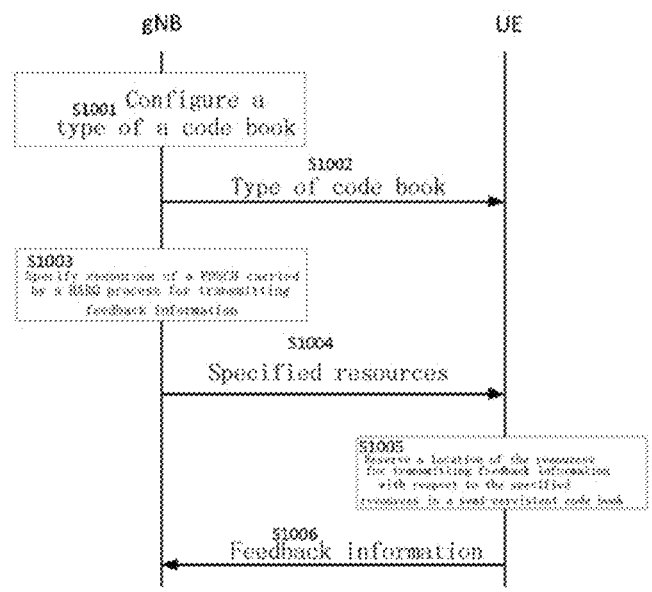
FIG. 10 is a signaling flow chart showing that a UE transmits feedback information in a case where a semi-persistent code book is configured according to another embodiment of the present disclosure.

A signaling flow chart showing that a UE transmits feedback information according to an embodiment of the present disclosure is described hereinafter in conjunction with FIGS. 8 to 10. FIG. 8 is a signaling flow chart showing that a UE transmits feedback information in a case where a dynamic code book is configured according to an embodiment of the present disclosure. FIGS. 9 and 10 are signaling flow charts showing that a UE transmits feedback information in a case where a semi-persistent code book is configured according to an embodiment of the present disclosure. In FIGS. 8 to 10, a gNB (that is, a base station device in a 5G system) may be implemented by the electronic device 300, and the UE may be implemented by the electronic device 700. In addition, in FIGS. 8 to 10, for convenience of description, only steps related to the present disclosure in the process of transmitting feedback information are shown, and other steps are omitted.

As shown in FIG. 8, in step S801, a type of a code book for transmitting feedback information configured by a gNB for a UE is a dynamic code book or a semi-persistent code book. Next, in step S802, the gNB transmits information representing the type of the code book to the UE. Here, it is assumed that the type of the code book is the dynamic code book. Next, in step S803, the gNB determines a DAI value for uplink assignment and a DAI value for downlink assignment according to the embodiment described above. Next, in step S804, the gNB transmits the DAI value for uplink assignment to the UE through the DCI for uplink assignment, and transmits the DAI value for downlink assignment to the UE through the DCI for downlink assignment. Next, in step S805, the UE generates feedback information according to the DAI value and the type of the code book with respect to a PDSCH carried by a HARQ process configured to transmit feedback information, each SPS release signaling, and SPS activation signaling corresponding to a SPS PDSCH carried by a HARQ process configured to not transmit feedback information. Next, in step S806, the UE transmits the generated feedback information to the gNB.

As shown in FIG. 9, in step S901, the type of the code book for transmitting feedback information configured by the gNB for the UE is the dynamic code book or the semi-persistent code book. Next, in step S902, the gNB transmits information representing the type of the code book to the UE. Here, it is assumed that the type of the code book is the semi-persistent code book. Next, in step S903, the gNB binds a HARQ process that is required to transmit feedback information with resources for transmitting a PDSCH carried by the HARQ process. Next, in step S904, the gNB transmits a binding relationship to the UE. Next, in step S905, the UE reserves a location of resources for transmitting feedback information only with respect to the bound resources in the semi-persistent code book for the received binding relationship. Next, in step S906, the UE transmits feedback information to the gNB by using the semi-persistent code book.

As shown in FIG. 10, in step S1001, the type of the code book for transmitting feedback information configured by the gNB for the UE is the dynamic code book or the semi-persistent code book. Next, in step S1002, the gNB transmits information representing the type of the code book to the UE. Here, it is assumed that the type of the code book is the semi-persistent code book. Next, in step S1003, the gNB specifies resources of the PDSCH carried by the HARQ process for transmitting feedback information. Next, in step S1004, the gNB transmits the specified resources to the UE. Next, in step S1005, the UE reserves a location of the resources for transmitting feedback information only with respect to the specified resources in the semi-persistent code book. Next, in step S1006, the UE transmits feedback information to the gNB by using the semi-persistent code book.

A wireless communication method performed by the electronic device 300 as a network side device in a wireless communication system according to an embodiment of the present disclosure is described in detail below.

Figure 11:
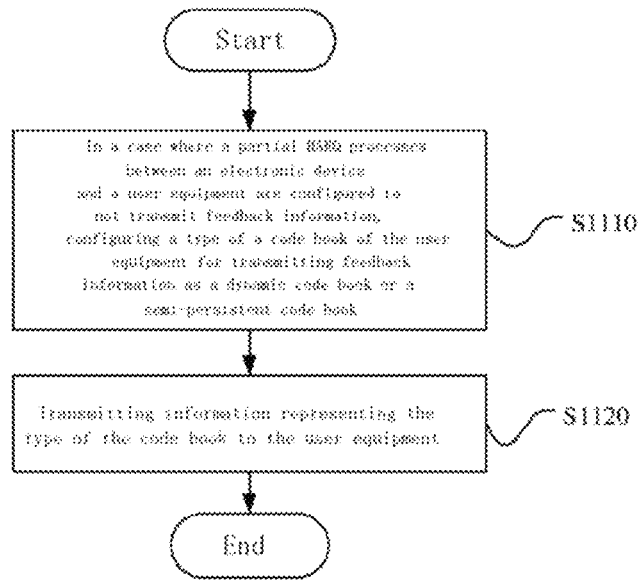
FIG. 11 is a flow chart showing a wireless communication method performed by an electronic device as a network side device according to an embodiment of the present disclosure.

FIG. 11 is a flow chart showing a wireless communication method performed by an electronic device 300 as a network side device in a wireless communication system according to the embodiment of the present disclosure.

As shown in FIG. 11, in step S1110, in a case where a partial HARQ processes between the electronic device 300 and the user equipment are configured to not transmit feedback information, a type of a code book of the user equipment for transmitting feedback information is configured as the dynamic code book or the semi-persistent code book.

Next, in step S1120, the information representing the type of the code book is transmitted to the user equipment.

Here, the electronic device 300 configures a default value of the type of the code book as the dynamic code book. Therefore, in a case where the user equipment receives no information representing the type of the code book from the electronic equipment 300, the type of the code book which is used for transmitting feedback information is determined as the dynamic code book.

In an embodiment, the wireless communication method further includes determining, in a case where the type of the code book is configured as the dynamic code book, a DAI value for uplink assignment according to the numbers of a dynamic scheduling PDSCH and a SPS PDSCH which are carried by a HARQ process configured to transmit feedback information, the number of SPS release signaling corresponding to SPS PDSCHs which are carried by the HARQ process configured to transmit feedback information and a HARQ process configured to not transmit feedback information, and the number of SPS activation signaling corresponding to a SPS PDSCH which is carried by the HARQ process configured to not transmit feedback information.

In an embodiment, the wireless communication method further includes determining, in a case where the type of the code book is configured as the dynamic code book, a DAI value for downlink assignment according to the number of the dynamic scheduling PDSCH which is carried by a HARQ process configured to transmit feedback information, the number of the SPS release signaling corresponding to the SPS PDSCHs which are carried by the HARQ process configured to transmit feedback information and the HARQ process configured to not transmit feedback information, and the number of the SPS activation signaling corresponding to the SPS PDSCH which is carried by the HARQ process configured to not transmit feedback information.

In an embodiment, the wireless communication method further includes determining, in a case where the type of the code book is configured as the semi-persistent code book, a correspondence between the HARQ process configured to transmit feedback information and time domain resources for transmitting the PDSCH carried by the HARQ process.

In an embodiment, the time domain resources include time domain resource allocation (TDRA), a sub-frame, a time slot, a sub-slot, and an OFDM symbol.

In an embodiment, the wireless communication method further includes determining, in a case where the type of the code book is configured as the semi-persistent code book, a correspondence between the HARQ process configured to transmit feedback information and frequency domain resources for transmitting the PDSCH carried by the HARQ process.

In an embodiment, the frequency domain resources include a component carrier (CC), a band width part (BWP), and a sub-band.

In an embodiment, the wireless communication method further includes determining, in a case where the type of the code book is configured as the semi-persistent code book, correspondences between the HARQ process configured to transmit feedback information and the time domain resources and the frequency domain resources for transmitting the PDSCH carried by the HARQ process.

In an embodiment, the time domain resources and the frequency domain resources include a code block group (CBG), a code block (CB), and a transmission block (TB).

In an embodiment, the wireless communication method further includes specifying, in a case where the type of the code book is configured as the semi-persistent code book, resources for transmitting the PDSCH carried by the HARQ process configured to transmit feedback information, so that when the electronic device 300 transmits downlink information to the user equipment utilizing the specified resources, the user equipment transmits feedback information with respect to the downlink information.

In an embodiment, the specified resources include time domain resources and/or frequency domain resources. In an embodiment, the wireless communication method further includes transmitting the information representing the type of the code book to the user equipment through RRC signaling.

According to an embodiment of the present disclosure, the above method may be performed by the electronic device 300 according to the embodiment of the present disclosure, and thus all the embodiments of the electronic device 300 described above are applicable herein.

Next, a wireless communication method performed by the electronic device 700 as a user equipment in a wireless communication system according to an embodiment of the present disclosure is described in detail.

Figure 12:
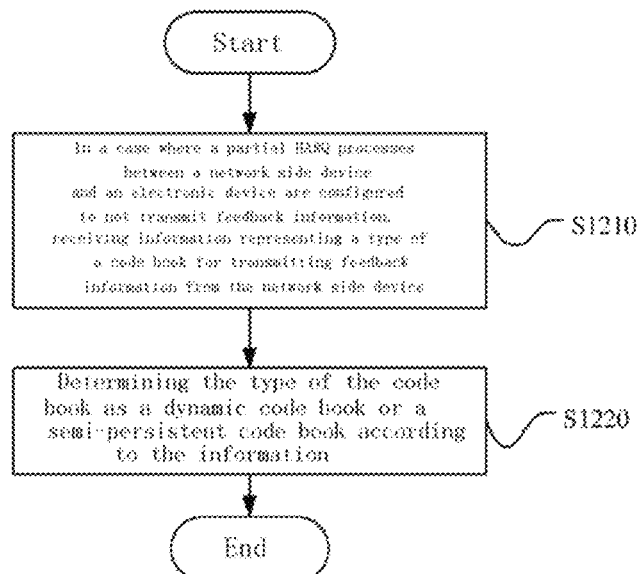
FIG. 12 is a flow chart showing a wireless communication method performed by an electronic device as a user equipment according to an embodiment of the present disclosure.

FIG. 12 is a flow chart showing a wireless communication method performed by the electronic device 700 as a user equipment in a wireless communication system according to an embodiment of the present disclosure.

As shown in FIG. 12, in step S1210, in a case where a partial HARQ processes between the network side device and the electronic device 700 are configured to not transmit feedback information, information representing the type of the code book for transmitting feedback information is received from the network side device.

Next, in step S1220, the type of the code book is determined as the dynamic code book or the semi-persistent code book according to the information.

Here, in a case where the electronic device 700 receives no information from the network side device, the type of the code book for transmitting feedback information is determined as the dynamic code book.

In an embodiment, the wireless communication method further includes receiving, in a case where the type of the code book is configured as the dynamic code book, the DAI value for uplink assignment from the network side device; and determining a sum of the numbers of the dynamic scheduling PDSCH and the SPS PDSCH which are carried by the HARQ process configured to transmit feedback information, the numbers of the SPS release signaling corresponding to the SPS PDSCHs carried by the HARQ process configured to transmit feedback information and the HARQ process configured to not transmit feedback information, and the number of the SPS activation signaling corresponding to the SPS PDSCH carried by the HARQ process configured to not transmit feedback information according to the DAI value for uplink assignment.

In an embodiment, the wireless communication method further includes receiving, in a case where the type of the code book is configured as the dynamic code book, the DAI value for downlink assignment from the network side device; and determining a sum of the number of the dynamic scheduling PDSCH carried by the HARQ process configured to transmit feedback information, the number of the SPS release signaling corresponding to the SPS PDSCHs carried by the HARQ process configured to transmit feedback information and the HARQ process configured to not transmit feedback information, and the number of the SPS activation signaling corresponding to the SPS PDSCH carried by the HARQ process configured to not transmit feedback information according to the DAI value for downlink assignment.

In an embodiment, the wireless communication method further includes transmitting feedback information to the network side device with respect to the SPS activation signaling corresponding to the SPS PDSCH carried by the HARQ process configured to not transmit feedback information.

In an embodiment, the wireless communication method further includes transmitting feedback information to the network side device with respect to SPS activation signaling corresponding to the a SPS PDSCH carried by the HARQ process configured to not transmit feedback information or the HARQ process configured to transmit feedback information.

In an embodiment, the wireless communication method further includes receiving correspondence information from the network side device in a case where the type of the code book is configured as the semi-persistent code book; and determining a correspondence between the HARQ process configured to transmit feedback information and the resources for transmitting the PDSCH carried by the HARQ process according to the correspondence information.

In an embodiment, the wireless communication method further includes reserving, in a case where there is a correspondence between the HARQ process configured to transmit feedback information and time domain resources for transmitting the PDSCH carried by the HARQ process, a location of resources for transmitting feedback information with respect to the time domain resources in the semi-persistent code book.

In an embodiment, the time domain resources include time domain resource allocation (TDRA), a sub-frame, a time slot, a sub-slot and an OFDM symbol.

In an embodiment, the wireless communication method further includes reserving, in a case where there is a correspondence between the HARQ process configured to transmit feedback information and frequency domain resources for transmitting the PDSCH carried by the HARQ process, a location of resources for transmitting feedback information for the frequency domain resources in the semi-persistent code book.

In an embodiment, the frequency domain resources include a component carrier, a band width part (BWP) and a sub-band.

In an embodiment, the wireless communication method further includes reserving, in a case where there is correspondences between the HARQ process configured to transmit feedback information and the time domain resources and the frequency domain resources for transmitting the PDSCH carried by the HARQ process, a location of resources for transmitting feedback information with respect to the time domain resources and the frequency domain resources in the semi-persistent code book.

In an embodiment, the time domain resources and the frequency domain resources include a code block group (CBG), a code block (CB), and a transmission block (TB).

In an embodiment, the wireless communication method further includes reserving, in a case where the type of the code book is configured as the semi-persistent code book, a location of resources for transmitting feedback information in the semi-static codebook for resources specified for transmitting the PDSCH carried by the HARQ process configured to transmit feedback information.

In an embodiment, the specified resources include time domain resources and/or frequency domain resources.

In an embodiment, the wireless communication method further includes reserving, in a case where the type of the code book is configured as the semi-persistent code book and all HARQ processes corresponding to one or more component carriers are configured to not transmit feedback information, a location of the resources for transmitting feedback information with respect to other frequency domain resources other than the one or more component carriers in the semi-persistent code book. In an embodiment, the wireless communication method further includes receiving the information representing the type of the code book for transmitting feedback information through RRC signaling.

According to the embodiment of the present disclosure, the above method may be performed by the electronic device 700 according to the embodiment of the present disclosure, and thus all the embodiments of the electronic device 700 described above are applicable here.

5. Application Examples

The technology of the present disclosure may be applied to various products.

The network side apparatus may be implemented as any type of TRP. The TRP may have transmitting and receiving functions. For example, the TRP may receive information from a user equipment and a base station device, and may transmit information to the user equipment and the base station device. In a typical example, the TRP may provide services for the user equipment and is controlled by the base station device. Further, the TRP may have a structure similar to the base station device described below, or may have a structure only related to transmission and reception of information in the base station device.

The network side device may further be implemented as any type of base station devices, such as a macro eNB and a small eNB, and may further be implemented as any type of gNB (a base station in a 5G system). The small eNB may be an eNB covering a cell smaller than a macro cell, such as a pico eNB, a micro eNB and a home (femto) eNB. Alternatively, the base station may be implemented as any other type of base station, such as a NodeB and a base transceiver station (BTS). The base station may include a body (which is further referred to as a base station device) configured to control wireless communications; and one or more remote radio heads (RRHs) arranged in a different position from the body.

The user equipment may be implemented as mobile terminals (such as a smart phone, a tablet personal computer (PC), a notebook PC, a portable game terminal, a portable/dongle mobile router and a digital camera) or a vehicle terminal (such as a car navigation apparatus). The user equipment may be a wireless communication module (such as an integrated circuit module including one or more chips) installed on each of the above terminals.

Figure 13:
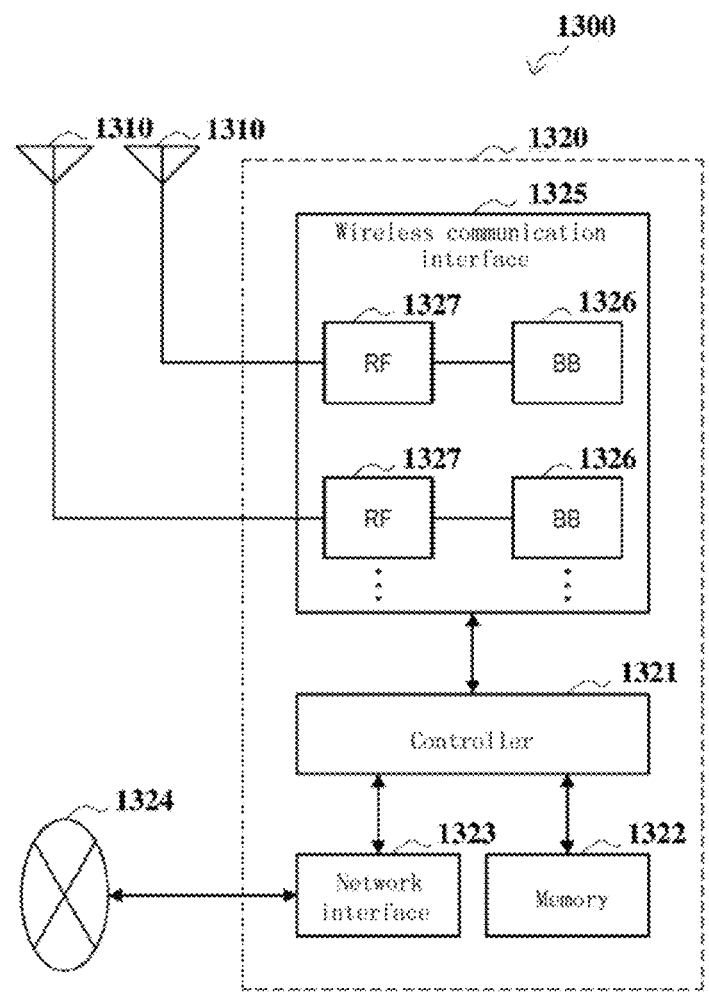
FIG. 13 is a block diagram showing a first schematic configuration example of an evolved node B (eNB)

FIG. 13 is a block diagram showing a first schematic configuration example of an eNB to which the technology according to the present disclosure may be applied. An eNB 1300 includes one or more antennas 1310 and a base station device 1320. The base station device 1320 and each of the antennas 1310 may be connected to each other via an RF cable.

Each of the antennas 1310 includes a single or multiple antenna elements (such as multiple antenna elements included in a multi-input multi-output (MIMO) antenna), and is used for the base station device 1320 to transmit and receive wireless signals. As shown in FIG. 13, the eNB 1300 may include the multiple antennas 1310. For example, the multiple antennas 2310 may be compatible with multiple frequency bands used by the eNB 1300. Although FIG. 13 shows the example in which the eNB 1300 includes the multiple antennas 1310, the eNB 1300 may also include a single antenna 1310.

The base station device 1320 includes a controller 1321, a memory 1322, a network interface 1323, and a wireless communication interface 1325.

The controller 2321 may be, for example, a CPU or a DSP, and operates various functions of a higher layer of the base station device 1320. For example, the controller 1321 generates a data packet from data in signals processed by the wireless communication interface 1325, and transfers the generated packet via the network interface 1323. The controller 1321 may bundle data from multiple base band processors to generate the bundled packet, and transfer the generated bundled packet. The controller 1321 may have logical functions of performing control such as radio resource control, radio bearer control, mobility management, admission control and scheduling. The control may be performed in corporation with an eNB or a core network node in the vicinity. The memory 1322 includes a RAM and a ROM, and stores a program executed by the controller 1321, and various types of control data (such as a terminal list, transmission power data, and scheduling data).

The network interface 1323 is a communication interface for connecting the base station device 1320 to a core network 1324. The controller 1321 may communicate with a core network node or another eNB via the network interface 1323. In this case, the eNB 1300, and the core network node or the other eNB may be connected to each other via a logical interface (such as an S1 interface and an X2 interface). The network interface 1323 may also be a wired communication interface or a wireless communication interface for wireless backhaul. If the network interface 1323 is a wireless communication interface, the network interface 1323 may use a higher frequency band for wireless communication than a frequency band used by the wireless communication interface 1325.

The wireless communication interface 1325 supports any cellular communication scheme (such as Long Term Evolution (LTE) and LTE-Advanced), and provides wireless connection to a terminal positioned in a cell of the eNB 1300 via the antenna 1310. The wireless communication interface 1325 may typically include, for example, a base band (BB) processor 1326 and an RF circuit 1327. The BB processor 1326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 1326 may have a part or all of the above-described logical functions instead of the controller 1321. The BB processor 1326 may be a memory that stores a communication control program, or a module that includes a processor and a related circuit configured to execute the program. Updating the program may allow the functions of the BB processor 1326 to be changed. The module may be a card or a blade that is inserted into a slot of the base station device 1320. Alternatively, the module may also be a chip that is mounted on the card or the blade. In addition, the RF circuit 1327 may include, for example, a mixer, a filter, and an amplifier, and transmits and receives wireless signals via the antenna 1310.

As shown in FIG. 13, the wireless communication interface 1325 may include the multiple BB processors 1326. For example, the multiple BB processors 1326 may be compatible with multiple frequency bands used by the eNB 1300. As shown in FIG. 13, the wireless communication interface 1325 may include the multiple RF circuits 1327. For example, the multiple RF circuits 1327 may be compatible with multiple antenna elements. Although FIG. 13 shows the example in which the wireless communication interface 1325 includes the multiple BB processors 1326 and the multiple RF circuits 1327, the wireless communication interface 1325 may also include a single BB processor 1326 or a single RF circuit 1327.

Figure 14:
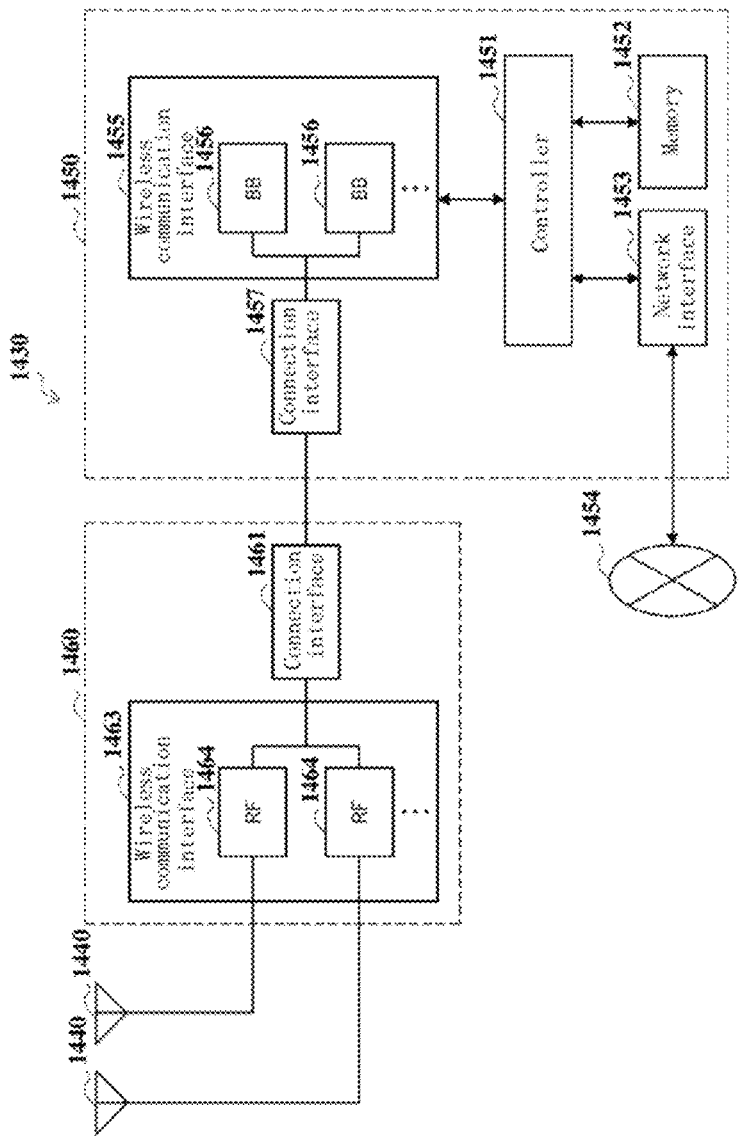
FIG. 14 is a block diagram showing a second schematic configuration example of an eNB.

FIG. 14 is a block diagram showing a second schematic configuration example of an eNB to which the technology according to the present disclosure may be applied. An eNB 1430 includes one or more antennas 1440, a base station device 1450, and an RRH 1460. The RRH 1460 and each antenna 1440 may be connected to each other via an RF cable. The base station device 1450 and the RRH 1460 may be connected to each other via a high speed line such as an optical fiber cable.

Each of the antennas 1440 includes a single or multiple antenna elements (such as multiple antenna elements included in an MIMO antenna), and is used for the RRH 1460 to transmit and receive wireless signals. As shown in FIG. 14, the eNB 1430 may include the multiple antennas 1440. For example, the multiple antennas 1440 may be compatible with multiple frequency bands used by the eNB 1430. Although FIG. 14 shows the example in which the eNB 1430 includes the multiple antennas 1440, the eNB 1430 may also include a single antenna 1440.

The base station device 1450 includes a controller 1451, a memory 1452, a network interface 1453, a wireless communication interface 1455, and a connection interface 1457. The controller 1451, the memory 1452, and the network interface 1453 are the same as the controller 1321, the memory 1322, and the network interface 1323 described with reference to FIG. 13.

The wireless communication interface 1455 supports any cellular communication scheme (such as LTE and LTE-Advanced), and provides wireless communication to a terminal positioned in a sector corresponding to the RRH 1460 via the RRH 1460 and the antenna 1440. The wireless communication interface 1455 may typically include, for example, a BB processor 1456. The BB processor 1456 is the same as the BB processor 1326 described with reference to FIG. 13, except that the BB processor 1456 is connected to an RF circuit 1464 of the RRH 1460 via the connection interface 1457. As shown in FIG. 14, the wireless communication interface 1455 may include the multiple BB processors 1456. For example, the multiple BB processors 1456 may be compatible with multiple frequency bands used by the eNB 1430. Although FIG. 14 shows the example in which the wireless communication interface 1455 includes the multiple BB processors 1456, the wireless communication interface 1455 may also include a single BB processor 1456.

The connection interface 1457 is an interface for connecting the base station device 1450 (the wireless communication interface 1455) to the RRH 1460. The connection interface 1457 may further be a communication module for communication in the above-described high speed line that connects the base station device 1450 (the wireless communication interface 1455) to the RRH 1460.

The RRH 1460 includes a connection interface 1461 and a wireless communication interface 1463.

The connection interface 1461 is an interface for connecting the RRH 1460 (the wireless communication interface 1463) to the base station device 1450. The connection interface 1461 may also be a communication module for communication in the above-described high speed line.

The wireless communication interface 1463 transmits and receives wireless signals via the antenna 1440. The wireless communication interface 1463 may typically include, for example, the RF circuit 1464. The RF circuit 1464 may include, for example, a mixer, a filter, and an amplifier, and transmits and receives wireless signals via the antenna 1440. As shown in FIG. 14, the wireless communication interface 1463 may include multiple RF circuits 1464. For example, the multiple RF circuits 1464 may support multiple antenna elements. Although FIG. 14 shows the example in which the wireless communication interface 1463 includes the multiple RF circuits 1464, the wireless communication interface 1463 may also include a single RF circuit 1464.

In the eNB 1300 and the eNB 1430 respectively shown in FIGS. 13 and 14, the code book type configuration unit 310, the HARQ process configuration unit 330, the uplink DAI determination unit 340, the downlink DAI determination unit 350, the binding unit 360 and the resource specifying unit 370 described in FIG. 3 may be implemented by the controller 1321 and/or the controller 1451. In addition, the communication unit 320 described in FIG. 3 may be implemented by the wireless communication interface 1325 and the wireless communication interface 1455 and/or the wireless communication interface 1463. At least part of the functions may also be implemented by the controller 1321 and the controller 1451. For example, the controller 1321 and/or the controller 1451 may perform, by executing instructions stored in the memory, the following functions: configuring the type of the code book, configuring whether each HARQ process is required to transmit feedback information, determining the DAI value for uplink assignment, determining the DAI value for downlink assignment, binding the HARQ process with the resources for transmitting the PDSCH carried by the HARQ process, and performing some resources for transmitting feedback information.

Figure 15:
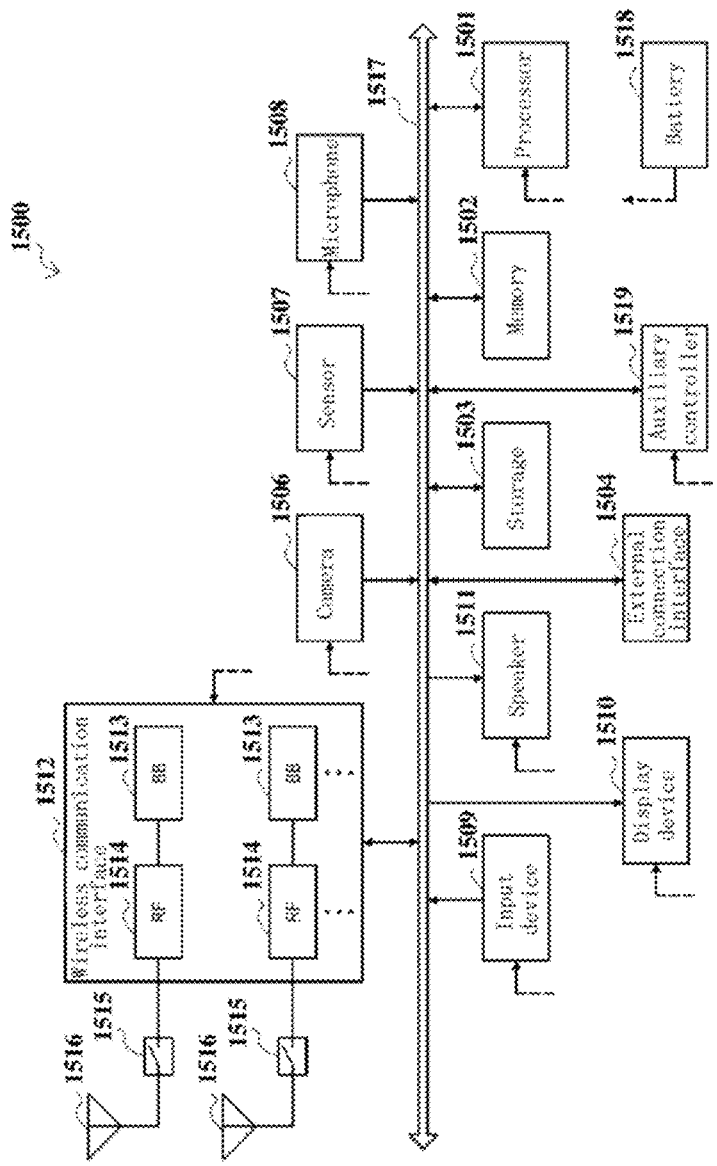
FIG. 15 is a block diagram showing a schematic configuration example of a smart phone.

FIG. 15 is a block diagram showing a schematic configuration example of a smart phone 1500 to which the technology according to the present disclosure may be applied. The smart phone 1500 includes a processor 1501, a memory 1502, a storage 1503, an external connection interface 1504, a camera 1506, a sensor 1507, a microphone 1508, an input device 1509, a display device 1510, a speaker 1511, a wireless communication interface 1512, one or more antenna switches 1515, one or more antennas 1516, a bus 1517, a battery 1518, and an auxiliary controller 1519.

The processor 1501 may be, for example, a CPU or a system on a chip (SoC), and controls functions of an application layer and another layer of the smart phone 1500. The memory 1502 includes RAM and ROM, and stores a program executed by the processor 1501 and data. The storage 1503 may include a storage medium such as a semiconductor memory and a hard disk. The external connection interface 1504 is an interface for connecting an external apparatus (such as a memory card and a universal serial bus (USB) apparatus) to the smart phone 1500.

The camera 1506 includes an image sensor (such as a charge coupled device (CCD) and a complementary metal oxide semiconductor (CMOS)), and generates a captured image. The sensor 1507 may include a group of sensors such as a measurement sensor, a gyro sensor, a geomagnetic sensor, and an acceleration sensor. The microphone 1508 converts sounds that are inputted to the smart phone 1500 to audio signals. The input device 1509 includes, for example, a touch sensor configured to detect touch onto a screen of the display device 1510, a keypad, a keyboard, a button, or a switch, and receive an operation or information inputted from a user. The display device 1510 includes a screen (such as a liquid crystal display (LCD) and an organic light-emitting diode (OLED) display), and displays an output image of the smart phone 1500. The speaker 1511 converts audio signals that are outputted from the smart phone 1500 to sounds.

The wireless communication interface 1512 supports any cellular communication scheme (such as LTE and LTE-Advanced), and performs wireless communication. The wireless communication interface 1512 may typically include, for example, a BB processor 1513 and a RF circuit 1514. The BB processor 1513 may perform, for example, encoding/decoding, modulating/demodulating, and multiplexing/demultiplexing, and performs various types of signal processing for wireless communication. In addition, the RF circuit 1514 may include, for example, a mixer, a filter, and an amplifier, and transmits and receives wireless signals via the antenna 1516. The wireless communication interface 1512 may be a chip module having the BB processor 1513 and the RF circuit 1514 integrated thereon. As shown in FIG. 15, the wireless communication interface 1512 may include multiple BB processors 1513 and multiple RF circuits 1514. Although FIG. 15 shows the example in which the wireless communication interface 1512 includes the multiple BB processors 1513 and the multiple RF circuits 1514, the wireless communication interface 1512 may also include a single BB processor 1513 or a single RF circuit 1514.

Furthermore, in addition to a cellular communication scheme, the wireless communication interface 1512 may support another type of wireless communication scheme such as a short-distance wireless communication scheme, a near field communication scheme, and a wireless local area network (LAN) scheme. In this case, the wireless communication interface 1512 may include the BB processor 1513 and the RF circuit 1514 for each wireless communication scheme.

Each of the antenna switches 1515 switches connection destinations of the antennas 1516 among multiple circuits (such as circuits for different wireless communication schemes) included in the wireless communication interface 1512.

Each of the antennas 1516 includes a single or multiple antenna elements (such as multiple antenna elements included in an MIMO antenna), and is used for the wireless communication interface 1512 to transmit and receive wireless signals. As shown in FIG. 15, the smart phone 1500 may include the multiple antennas 1516. Although FIG. 15 shows the example in which the smart phone 1500 includes the multiple antennas 1516, the smart phone 1500 may also include a single antenna 1516.

Furthermore, the smart phone 1500 may include the antenna 1516 for each wireless communication scheme. In this case, the antenna switches 1515 may be omitted from the configuration of the smart phone 1500.

The bus 1517 connects the processor 1501, the memory 1502, the storage 1503, the external connection interface 1504, the camera 1506, the sensor 1507, the microphone 1508, the input device 1509, the display device 1510, the speaker 1511, the wireless communication interface 1512, and the auxiliary controller 1519 to each other. The battery 1518 supplies power to blocks of the smart phone 1500 shown in FIG. 15 via feeder lines that are partially shown as dashed lines in the FIG. 15. The auxiliary controller 1519 operates a minimum necessary function of the smart phone 1500, for example, in a sleep mode.

In the smart phone 1500 shown in FIG. 15, the code book type determination unit 720, the uplink DAI decoding unit 730, the downlink DAI decoding unit 740, the HARQ process determination unit 750, the feedback information generation unit 760, the binding relationship determination unit 770, the code book processing unit 780, and the specified resource determination unit 790 described in FIG. 7 may be implemented by the processor 1501 or the auxiliary controller 1519. In addition, the communication unit 710 described in FIG. 7 may be implemented by the wireless communication interface 1512. At least part of functions of the functions may also be implemented by the controller 1501 or the auxiliary controller 1519. For example, the controller 1501 or the auxiliary controller 1519 may perform, by executing instructions stored in the memory 1502 or the storage 1503, the following functions: determining the type of the code book, decoding the uplink DAI value, decoding the downlink DAI value, determining whether each HARQ process is required to transmit feedback information, generating feedback information, determining a binding relationship between a HARQ process and resources for transmitting a PDSCH carried by the HARQ process, reserving resources for transmitting feedback information in the semi-persistent code book and determining resources that are required to transmit feedback information.

Figure 16:
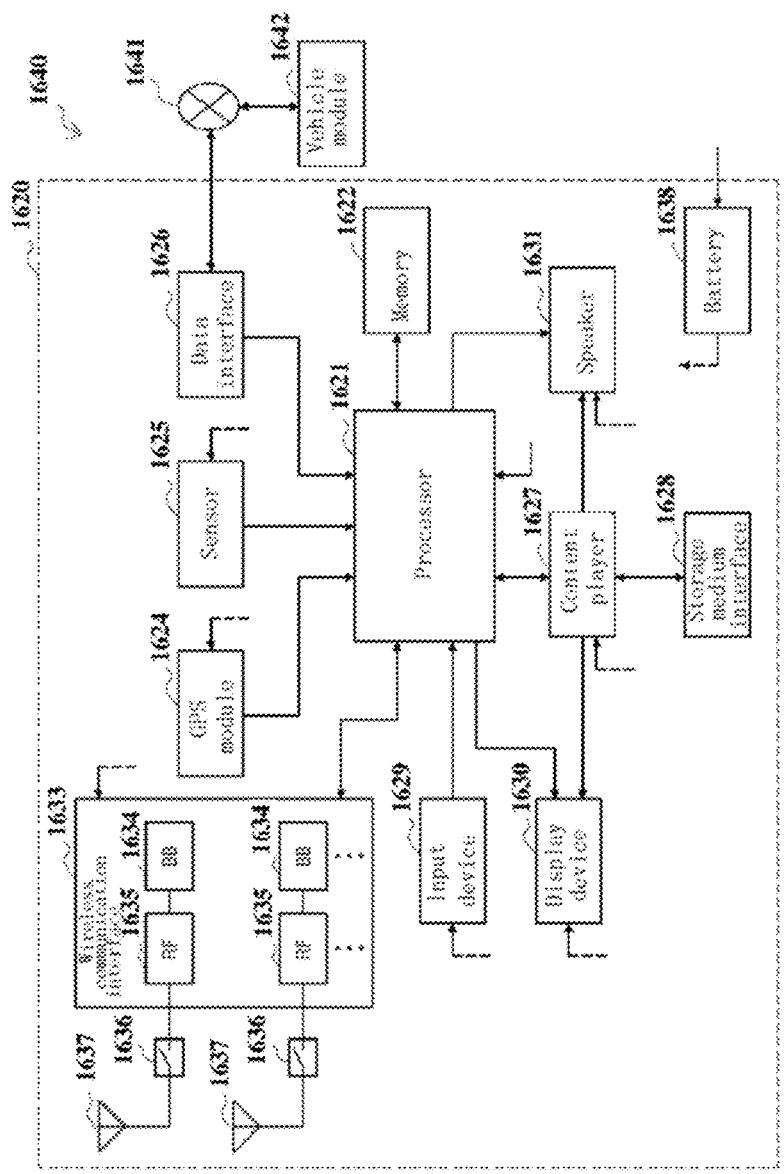
FIG. 16 is a block diagram showing a schematic configuration example of a car navigation device.

FIG. 16 is a block diagram showing a schematic configuration example of a car navigation apparatus 1620 to which the technology of the present disclosure may be applied. The car navigation apparatus 1620 includes a processor 1621, a memory 1622, a global positioning system (GPS) module 1624, a sensor 1625, a data interface 1626, a content player 1627, a storage medium interface 1628, an input device 1629, a display device 1630, a speaker 1631, a wireless communication interface 1633, one or more antenna switches 1636, one or more antennas 1637, and a battery 1638.

The processor 1621 may be, for example, a CPU or a SoC, and controls a navigation function and another function of the car navigation apparatus 1620. The memory 1622 includes a RAM and a ROM, and stores a program executed by the processor 1621 and data.

The GPS module 1624 determines a position (such as latitude, longitude, and altitude) of the car navigation apparatus 1620 by using GPS signals received from a GPS satellite. The sensor 1625 may include a group of sensors such as a gyro sensor, a geomagnetic sensor, and an air pressure sensor. The data interface 1626 is connected to, for example, an in-vehicle network 1641 via a terminal that is not shown, and acquires data (such as vehicle speed data) generated by the vehicle.

The content player 1627 reproduces content stored in a storage medium (such as a CD and a DVD) that is inserted into the storage medium interface 1628. The input device 1629 includes, for example, a touch sensor configured to detect touch onto a screen of the display device 1630, a button or a switch, and receives an operation or information inputted from a user. The display device 1630 includes a screen such as an LCD or an OLED display, and displays an image of the navigation function or content that is reproduced. The speaker 1631 outputs sounds of the navigation function or the content that is reproduced.

The wireless communication interface 1633 supports any cellular communication scheme (such as LTE and LTE-Advanced), and performs wireless communication. The wireless communication interface 1633 may typically include, for example, a BB processor 1634 and an RF circuit 1635. The BB processor 1634 may perform, for example, encoding/decoding, modulating/demodulating, and multiplexing/demultiplexing, and performs various types of signal processing for wireless communication. In addition, the RF circuit 1635 may include, for example, a mixer, a filter, and an amplifier, and transmits and receives wireless signals via the antenna 1637. The wireless communication interface 1633 may also be a chip module having the BB processor 1634 and the RF circuit 1635 integrated thereon. As shown in FIG. 16, the wireless communication interface 1633 may include the multiple BB processors 1634 and the multiple RF circuits 1635. Although FIG. 16 shows the example in which the wireless communication interface 1633 includes the multiple BB processors 1634 and the multiple RF circuits 1635, the wireless communication interface 1633 may also include a single BB processor 1634 or a single RF circuit 1635.

Furthermore, in addition to the cellular communication scheme, the wireless communication interface 1633 may support another type of wireless communication scheme such as a short-distance wireless communication scheme, a near field communication scheme, and a wireless LAN scheme. In this case, the wireless communication interface 1633 may include the BB processor 1634 and the RF circuit 1635 for each wireless communication scheme.

Each of the antenna switches 1636 switches connection destinations of the antennas 1637 among multiple circuits (such as circuits for different wireless communication schemes) included in the wireless communication interface 1633.

Each of the antennas 1637 includes a single or multiple antenna elements (such as multiple antenna elements included in an MIMO antenna), and is used for the wireless communication interface 1633 to transmit and receive wireless signals. As shown in FIG. 16, the car navigation apparatus 1620 may include the multiple antennas 1637. Although FIG. 16 shows the example in which the car navigation apparatus 1620 includes the multiple antennas 1637, the car navigation apparatus 1620 may also include a single antenna 1637.

Furthermore, the car navigation apparatus 1620 may include the antenna 2137 for each wireless communication scheme. In this case, the antenna switches 1636 may be omitted from the configuration of the car navigation apparatus 1620.

The battery 1638 supplies power to blocks of the car navigation apparatus 1620 shown in FIG. 16 via feeder lines that are partially shown as dashed lines in the FIG. 16. The battery 1638 accumulates power supplied from the vehicle.

In the car navigation apparatus 1620 shown in FIG. 16, the code book type determination unit 720, the uplink DAI decoding unit 730, the downlink DAI decoding unit 740, the HARQ process determination unit 750, the feedback information generation unit 760, the binding relationship determination unit 770, the code book processing unit 780, and the specified resource determination unit 790 described in FIG. 7 may be implemented by the processor 1621. In addition, the communication unit 710 described in FIG. 7 may be implemented by the wireless communication interface 1633. At least part of functions of the functions may also be implemented by the processor 1621. For example, the processor 1621 may perform, by executing instructions stored in the memory 1622, the following functions: determining the type of the code book, decoding the uplink DAI value, decoding the downlink DAI value, determining whether each HARQ process is required to transmit feedback information, generating feedback information, determining a binding relationship between a HARQ process and resources for transmitting a PDSCH carried by the HARQ process, reserving resources for transmitting feedback information in the semi-persistent code book and determining resources that are required to transmit feedback information.

The technology of the present disclosure may also be implemented as an in-vehicle system (or a vehicle) 1640 including one or more blocks of the car navigation apparatus 1620, the in-vehicle network 1641 and a vehicle module 1642. The vehicle module 1642 generates vehicle data (such as a vehicle speed, an engine speed or failure information), and outputs the generated data to the in-vehicle network 1641.

Preferred embodiments of the present disclosure are described above with reference to the drawings, but the present disclosure is not limited to the above examples of course. Those skilled in the art may make various changes and modifications within the scope of the appended claims, and it should be understood that such changes and modifications naturally fall within the technical scope of the present disclosure.

For example, units shown by a dotted line block in the functional block diagram shown in the drawings indicate that the functional units are optional in the corresponding device, and the optional functional units may be combined in an appropriate way to implement a required function.

For example, in the above embodiments, multiple functions in one unit may be implemented by separate devices. Alternatively, in the above embodiments, multiple functions in multiple units may be respectively implemented by separate devices. In addition, one of the above functions may be implemented by multiple units. Needless to say, such configurations are within the technical scope of the present disclosure.

In the present disclosure, steps described in the flow charts are not limited to be performed in a chronological order, but may also be performed in parallel or independently rather than necessarily being in the time order. In addition, in a case that the steps are performed in the chronological order, needless to say, the order may also be changed appropriately.

Although the embodiments of the present disclosure are described above in conjunction with the drawings, it should be understood that the embodiments are only used to illustrate the present disclosure rather than limit the present disclosure. For those skilled in the art, various changes and modifications may be made for the embodiments without departing from the essence and scope of the present disclosure. Therefore, the scope of the present disclosure is defined only by appended claims and equivalent meaning thereof.

The invention claimed is:

1. An electronic device, comprising processing circuitry configured to:
    upon determining that a partial hybrid automatic repeat request (HARQ) process between the electronic device and a user equipment are configured to not transmit feedback information, configure a type of a code book to be used by the user equipment to transmit feedback information as a dynamic code book or a semi-persistent code book; and
    transmit information representing the type of the code book to the user equipment,
    wherein the electronic device configures a default value of the type of the code book as the dynamic code book, such that upon determining that the user equipment receives no information representing the type of the code book from the electronic device, the type of the code book used by the user equipment to transmit the feedback information is the dynamic code book, wherein, upon determining that the type of the code book is configured as the dynamic code book, the processing circuitry is further configured to perform at least one of a first process or a second process wherein the first process comprises:

determining a downlink assignment indicator (DAI) value for uplink assignment according to:

numbers of a dynamic scheduling Physical Downlink Shared Channel (PDSCH) and a semi-persistent scheduling (SPS) PDSCH which are carried by a HARQ process corresponding to the uplink assignment and configured to transmit feedback information, a number of SPS release signaling corresponding to SPS PDSCHs which are carried by the HARQ process corresponding to the uplink assignment and configured to transmit feedback information and a HARQ process configured to not transmit feedback information, and a number of SPS activation signaling corresponding to a SPS PDSCH which is carried by the HARQ process configured to not transmit feedback information, and wherein the second process comprises:

determining a downlink assignment indicator (DAI) value for downlink assignment according to:

a number of a dynamic scheduling Physical Downlink Shared Channel (PDSCH) which is carried by a HARQ process corresponding to the downlink assignment and configured to transmit feedback information, a number of semi-persistent scheduling (SPS) release signaling corresponding to SPS PDSCHs which are carried by the HARQ process corresponding to the downlink assignment and configured to transmit feedback information and a HARQ process configured to not transmit feedback information, and a number of SPS activation signaling corresponding to a SPS PDSCH which is carried by the HARQ process configured to not transmit feedback information.

2. The electronic device according to claim 1, wherein the processing circuitry is further configured to:

upon determining that the type of the code book is configured as the semi-persistent code book, determine a correspondence between a HARQ process corresponding to the semi-persistent code book and configured to transmit feedback information and time domain resources for transmitting a PDSCH carried by the HARQ process.

3. The electronic device according to claim 1, wherein the processing circuitry is further configured to:

upon determining that the type of the code book is configured as the semi-persistent code book, determine a correspondence between a HARQ process corresponding to the semi-persistent code book and configured to transmit feedback information and frequency domain resources for transmitting a PDSCH carried by the HARQ process.

4. The electronic device according to claim 1, wherein the processing circuitry is further configured to:

upon determining that the type of the code book is configured as a semi-persistent code book, determine correspondences between a HARQ process corresponding to the semi-persistent code book and configured to transmit feedback information and time domain resources and frequency domain resources for transmitting a PDSCH carried by the HARQ process.

5. The electronic device according to claim 1, wherein the processing circuitry is further configured to:

upon determining that the type of the code book is configured as a semi-persistent code book, specify resources for transmitting a PDSCH carried by a HARQ process corresponding to the semi-persistent code book and configured to transmit feedback information, such that when the electronic device transmits downlink information to the user equipment utilizing the specified resources, the user equipment transmits feedback information with respect to the downlink information.

6. An electronic device, comprising processing circuitry configured to:

upon determining that a partial hybrid automatic repeat request (HARQ) process between a network side device and the electronic device are configured to not transmit feedback information, receive, from the network side device, information representing a type of a code book to be used by the electronic device to transmit feedback information; and determine the type of the code book as a dynamic code book or a semi-persistent code book according to the information, wherein upon determining that the electronic device receives no information from the network side device, the type of the code book used by the electronic device to transmit the feedback information is the dynamic code book, wherein, upon determining that the type of the code book is configured as the dynamic code book, the processing circuitry is further configured to perform at least one of a first process or a second process, wherein the first process comprises:

determining a downlink assignment indicator (DAI) value for uplink assignment according to:

numbers of a dynamic scheduling Physical Downlink Shared Channel (PDSCH) and a semi-persistent scheduling (SPS) PDSCH which are carried by a HARQ process corresponding to the uplink assignment and configured to transmit feedback information, a number of SPS release signaling corresponding to SPS PDSCHs which are carried by the HARQ process corresponding to the uplink assignment and configured to transmit feedback information and a HARQ process configured to not transmit feedback information, and a number of SPS activation signaling corresponding to a SPS PDSCH which is carried by the HARQ process configured to not transmit feedback information, and wherein the second process comprises:

determining a downlink assignment indicator (DAI) value for downlink assignment according to:

a number of a dynamic scheduling Physical Downlink Shared Channel (PDSCH) which is carried by a HARQ process corresponding to the downlink assignment and configured to transmit feedback information, a number of semi-persistent scheduling (SPS) release signaling corresponding to SPS PDSCHs which are carried by the HARQ process corresponding to the downlink assignment and configured to transmit feedback information and a HARQ process configured to not transmit feedback information, and a number of SPS activation signaling corresponding to a SPS PDSCH which is carried by the HARQ process configured to not transmit feedback information.

7. The electronic device according to claim 6, wherein the processing circuitry is further configured to:

transmit feedback information to the network side device with respect to SPS activation signaling corresponding to a SPS PDSCH carried by a HARQ process configured to not transmit feedback information.

8. The electronic device according to claim 6, wherein the processing circuitry is further configured to:
transmit feedback information to the network side device with respect to SPS release signaling corresponding to a SPS PDSCH carried by a HARQ process configured to not transmit feedback information or a HARQ process configured to transmit feedback information.

9. The electronic device according to claim 6, wherein the processing circuitry is further configured to:
receive correspondence information from the network side device upon determining that the type of the code book is configured as the semi-persistent code book; and
determine a correspondence between a HARQ process corresponding to the semi-persistent code book and configured to transmit feedback information and resources for transmitting the PDSCH carried by the HARQ process according to the correspondence information.

10. The electronic device according to claim 9, wherein the processing circuitry is further configured to:
upon determining that there is a correspondence between the HARQ process corresponding to the semi-persistent code book and configured to transmit feedback information and time domain resources for transmitting a PDSCH carried by the HARQ process corresponding to the semi-persistent code book, reserve a location of resources for transmitting feedback information with respect to the time domain resources in the semi-persistent code book.

11. The electronic device according to claim 9, wherein the processing circuitry is further configured to:
upon determining that there is a correspondence between the HARQ process configured to transmit feedback information and frequency domain resources for transmitting the PDSCH carried by the HARQ process corresponding to the semi-persistent code book, reserve a location of resources for transmitting feedback information with respect to the frequency domain resources in the semi-persistent code book.

12. The electronic device according to claim 9, wherein the processing circuitry is further configured to:
upon determining that there are correspondences between the HARQ process corresponding to the semi-persistent code book and configured to transmit feedback information and time domain resources and frequency domain resources for transmitting the PDSCH carried by the HARQ process corresponding to the semi-persistent code book, reserve a location of resources for transmitting feedback information with respect to the time domain resources and the frequency domain resources in the semi-persistent code book.

13. The electronic device according to claim 6, wherein the processing circuitry is further configured to:
upon determining that the type of the code book is configured as the semi-persistent code book, reserve a position of resources for transmitting feedback information with respect to resources specified for transmitting a PDSCH carried by a HARQ process corresponding to the semi-persistent code book and configured to transmit feedback information in the semi-persistent code book.

14. The electronic device according to claim 13, wherein the specified resources comprise at least one of time domain resources or frequency domain resources.

15. The electronic device according to claim 6, wherein the processing circuitry is further configured to:
upon determining that the type of the code book is configured as the semi-persistent code book and all HARQ processes corresponding to one or more component carriers are configured to not transmit feedback information, reserve a location of resources for transmitting feedback information with respect to other frequency domain resources other than the one or more component carriers in the semi-persistent code book.

16. A wireless communication method performed by an electronic device, comprising:
upon determining that a partial hybrid automatic repeat request (HARQ) process between the electronic device and a user equipment are configured to not transmit feedback information, configuring a type of a code book to be used by the user equipment to transmit feedback information as a dynamic code book or a semi-persistent code book; and
transmitting information representing the type of the code book to the user equipment,
wherein the electronic device configures a default value of the type of the code book as the dynamic code book, such that upon determining that the user equipment receives no information representing the type of the code book from the electronic device, the type of the code book used by the user equipment to transmit the feedback information is the dynamic code book,
wherein, upon determining that the type of the code book is configured as the dynamic code book, the method further comprises performing at least one of a first process or a second process
wherein the first process comprises:
determining a downlink assignment indicator (DAI) value for uplink assignment according to:
the numbers of a dynamic scheduling Physical Downlink Shared Channel (PDSCH) and a semi-persistent scheduling (SPS) PDSCH which are carried by a HARQ process configured to transmit feedback information,
the number of SPS release signaling corresponding to SPS PDSCHs which are carried by the HARQ process configured to transmit feedback information and a HARQ process configured to not transmit feedback information, and
the number of SPS activation signaling corresponding to a SPS PDSCH which is carried by the HARQ process configured to not transmit feedback information, and
wherein the second process comprises:
determining a downlink assignment indicator (DAI) value for downlink assignment according to:
the number of a dynamic scheduling Physical Downlink Shared Channel (PDSCH) which is carried by a HARQ process configured to transmit feedback information,
the number of semi-persistent scheduling (SPS) release signaling corresponding to SPS PDSCHs which are carried by the HARQ process configured to transmit feedback information and a HARQ process configured to not transmit feedback information, and
the number of SPS activation signaling corresponding to a SPS PDSCH which is carried by the HARQ process configured to not transmit feedback information.

* * * * *